United States Patent
Pasini et al.

(10) Patent No.: US 10,767,032 B2
(45) Date of Patent: Sep. 8, 2020

(54) BISTABLE AUXETICS

(71) Applicant: THE ROYAL INSTITUTION FOR THE ADVANCEMENT OF LEARNING/MCGILL UNIVERSITY, Montreal (CA)

(72) Inventors: Damiano Pasini, Montreal (CA); Ahmad Rafsanjani Abbasi, Montreal (CA)

(73) Assignee: THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 62 days.

(21) Appl. No.: 15/612,212

(22) Filed: Jun. 2, 2017

(65) Prior Publication Data
US 2017/0362414 A1    Dec. 21, 2017

Related U.S. Application Data

(60) Provisional application No. 62/344,675, filed on Jun. 2, 2016.

(51) Int. Cl.
*B32B 3/26* (2006.01)
*C08L 7/02* (2006.01)
*C08L 7/00* (2006.01)

(52) U.S. Cl.
CPC .............. *C08L 7/02* (2013.01); *B32B 3/266* (2013.01); *C08L 7/00* (2013.01); *Y10T 428/24314* (2015.01)

(58) Field of Classification Search
CPC ..... Y10T 428/24273; Y10T 428/24298; Y10T 428/24306; Y10T 428/24314; Y10T 428/12361; B32B 3/00; B32B 3/10; B32B 3/12; B32B 3/24; B32B 3/266; B32B 5/00; B32B 5/028; B32B 5/04; B32B 2305/38; B32B 2459/00; B29C 2793/0036; A61F 2/00; A61F 2/02; A61F 2/04; A61F 2/06;
(Continued)

(56) References Cited

U.S. PATENT DOCUMENTS 3,655,501 A  *  4/1972  Tesch ..................... A47G 27/00
                                                        428/136
5,080,944 A  *  1/1992  Kauffman ............... B29B 15/08
                                                        156/163
(Continued)

FOREIGN PATENT DOCUMENTS

EP           2702884          3/2014
WO         2014149078         9/2014
(Continued)

*Primary Examiner* — Maria V Ewald
*Assistant Examiner* — Ethan A. Utt
(74) *Attorney, Agent, or Firm* — Norton Rose Fulbright Canada

(57) ABSTRACT

An auxetic metamaterial including a plurality of interconnected building blocks that are deformable between a collapsed position and an expanded position upon the application of a load. The building blocks are bistable, and define a stable state in both the collapsed position and the expanded position. In the stable state, the building blocks maintain the collapsed position or the expanded position, even after removal of the load applied on the building block.

21 Claims, 44 Drawing Sheets

(58) Field of Classification Search
CPC ...... A61F 2/07; A61F 2/82; A61F 2/86; A61F 2/90; A61F 2/91; A61F 2230/00; A61F 2230/0002; A61F 2230/0004; A61F 2230/0017; A61F 2230/0019; A61F 2230/0021; A61F 2230/0023; A61F 2230/0026; A61F 2230/0063; A61F 2250/00; A61F 2250/0058
USPC ......... 428/131, 134–136, 596; 264/154–156, 264/145, 146; 623/1.15, 1.16
See application file for complete search history.

(56) References Cited

U.S. PATENT DOCUMENTS

| | | | | |
|---|---|---|---|---|
| 5,082,708 | A * | 1/1992 | Kauffman | B29C 70/26 428/47 |
| 6,488,702 | B1 * | 12/2002 | Besselink | A61B 17/11 623/1.15 |
| 6,790,933 | B2 * | 9/2004 | Huynh | B29C 41/14 524/925 |
| 8,034,103 | B2 | 10/2011 | Burriesci et al. | |
| 8,084,117 | B2 * | 12/2011 | Lalvani | B32B 3/266 428/135 |
| 8,353,948 | B2 * | 1/2013 | Besselink | A61B 17/11 623/1.15 |
| 8,486,507 | B2 * | 7/2013 | De Luca | B29C 44/5654 428/131 |
| 8,523,944 | B2 * | 9/2013 | Jimenez | A61F 2/4455 623/17.15 |
| 8,540,452 | B2 * | 9/2013 | Jimenez | A61F 2/442 403/220 |
| 8,544,515 | B2 | 10/2013 | Ma | |
| 8,652,602 | B1 | 2/2014 | Dolla | |
| 8,772,187 | B2 | 7/2014 | Ugbolue et al. | |
| 8,883,287 | B2 * | 11/2014 | Boyce | B29C 59/02 174/254 |
| 9,220,615 | B2 * | 12/2015 | Denison | A61F 2/915 |
| 9,709,274 | B2 * | 7/2017 | Innes | F23R 3/002 |
| 2004/0031086 | A1 * | 2/2004 | Huynh | B29C 41/14 2/161.7 |
| 2006/0217795 | A1 * | 9/2006 | Besselink | A61F 2/064 623/1.15 |
| 2007/0122590 | A1 * | 5/2007 | Lalvani | B32B 3/266 428/136 |
| 2008/0032598 | A1 | 2/2008 | Bentham et al. | |
| 2010/0185291 | A1 * | 7/2010 | Jimenez | A61F 2/4611 623/17.16 |
| 2010/0209184 | A1 * | 8/2010 | Jimenez | F16F 1/025 403/291 |
| 2010/0330330 | A1 * | 12/2010 | Luca | B29C 44/5654 428/137 |
| 2010/0330338 | A1 * | 12/2010 | Boyce | B29C 59/02 428/156 |
| 2011/0029063 | A1 | 2/2011 | Ma | |
| 2011/0056886 | A1 * | 3/2011 | De Luca | B29C 44/5654 210/671 |
| 2011/0059291 | A1 * | 3/2011 | Boyce | C08J 5/00 428/136 |
| 2011/0240286 | A1 | 10/2011 | Williams et al. | |
| 2013/0178926 | A1 * | 7/2013 | Denison | A61F 2/915 623/1.16 |
| 2013/0322955 | A1 | 12/2013 | Ma | |
| 2013/0344601 | A1 | 12/2013 | Soman | |
| 2014/0017422 | A1 | 1/2014 | Ma | |
| 2014/0260281 | A1 * | 9/2014 | Innes | B23K 35/228 60/752 |
| 2014/0270936 | A1 | 9/2014 | Gerendas et al. | |
| 2015/0075033 | A1 | 3/2015 | Cross et al. | |
| 2016/0025343 | A1 * | 1/2016 | Bertoldi | B23K 15/08 60/722 |
| 2016/0025344 | A1 * | 1/2016 | Bertoldi | B32B 3/10 428/613 |

FOREIGN PATENT DOCUMENTS

| | | | | |
|---|---|---|---|---|
| WO | WO-2014151045 A1 * | 9/2014 | ............ | B32B 3/266 |
| WO | WO-2014197059 A1 * | 12/2014 | ............ | B23K 26/38 |
| WO | 2015109359 | 7/2015 | | |

* cited by examiner

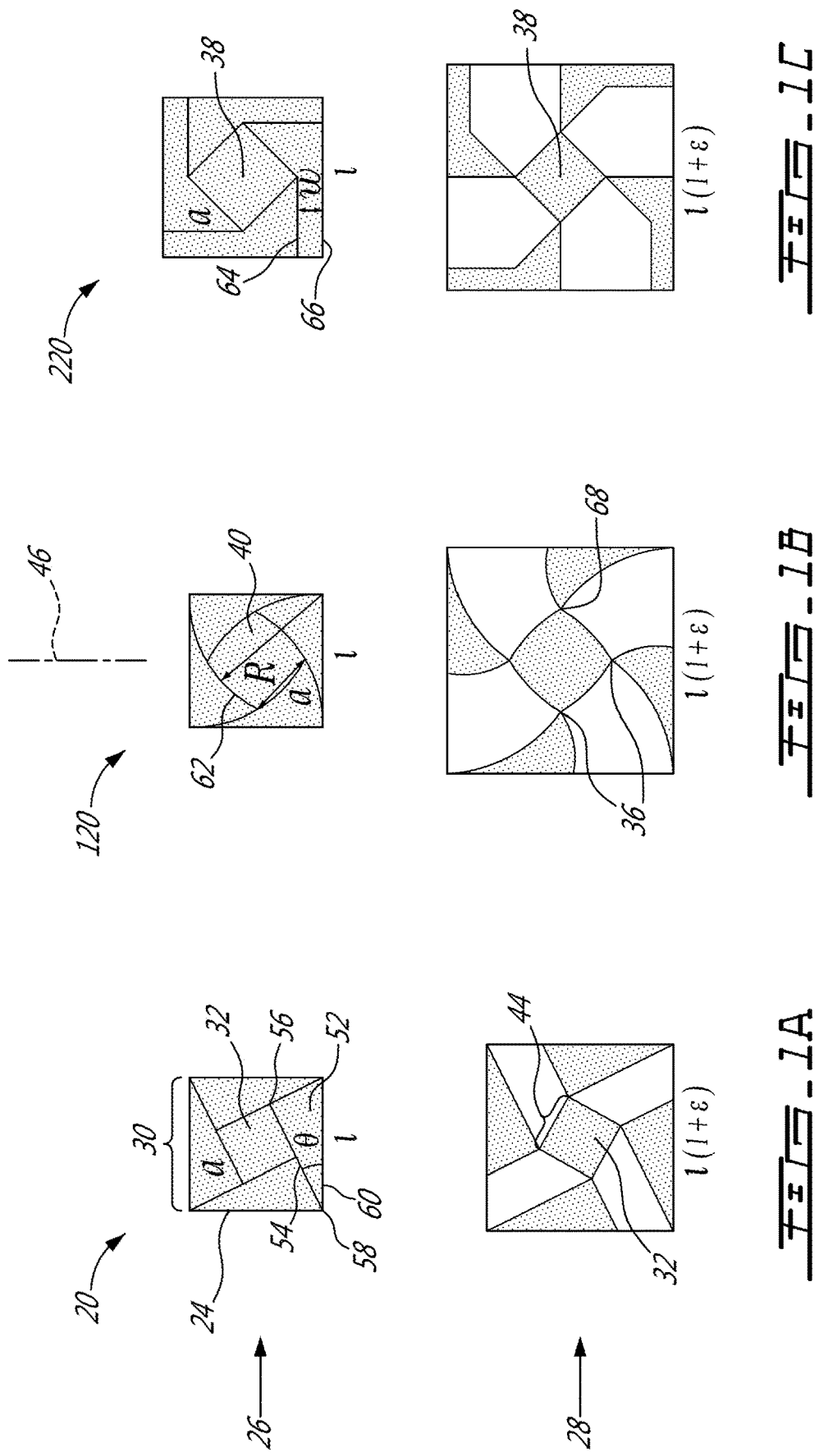

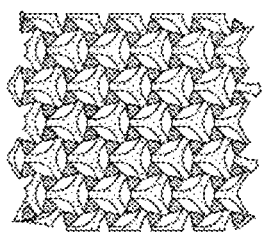
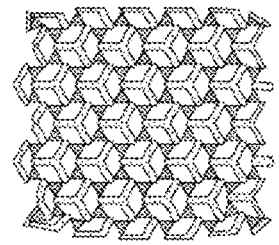
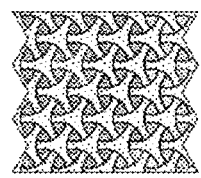
FIG. 2E
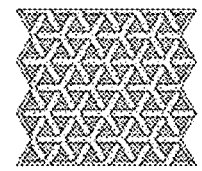
FIG. 2F
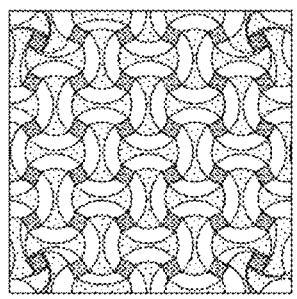
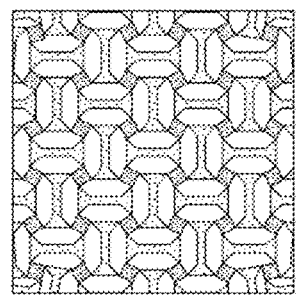
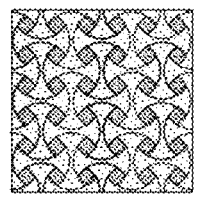
FIG. 2G
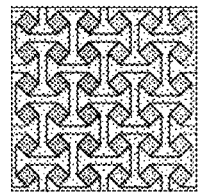
FIG. 2H

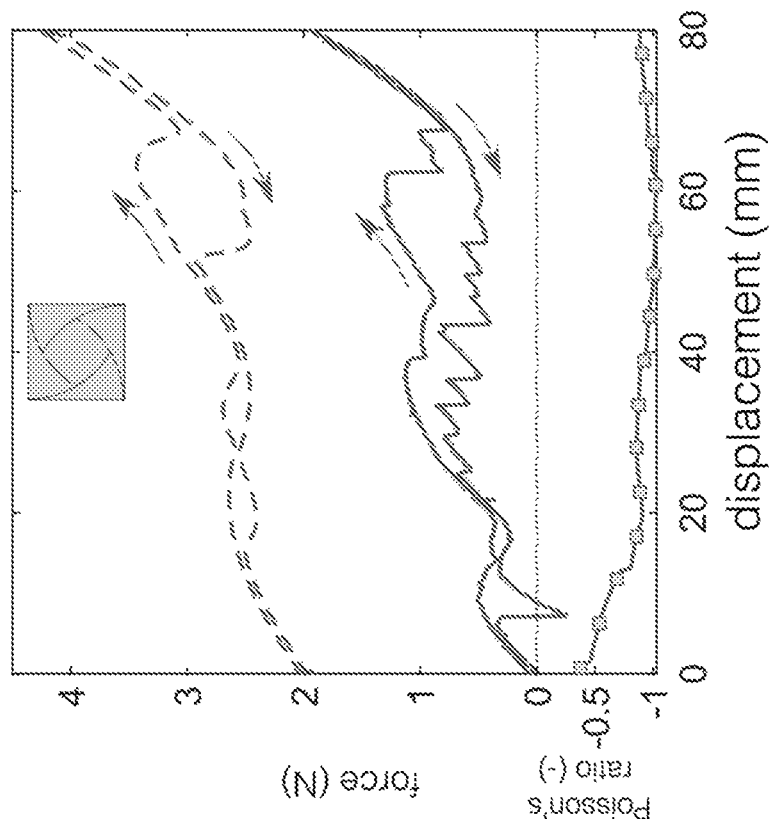
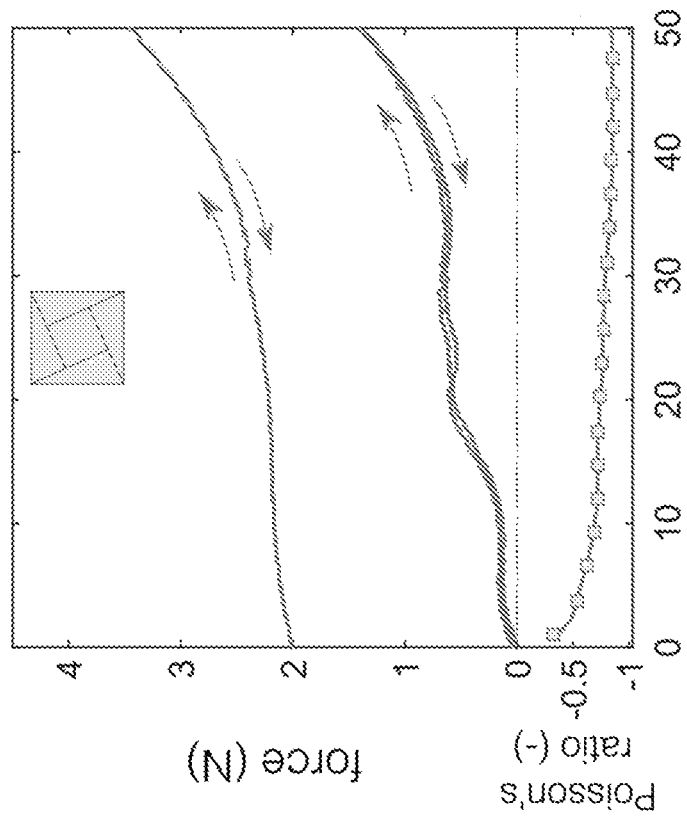
FIG. 3A
FIG. 3B

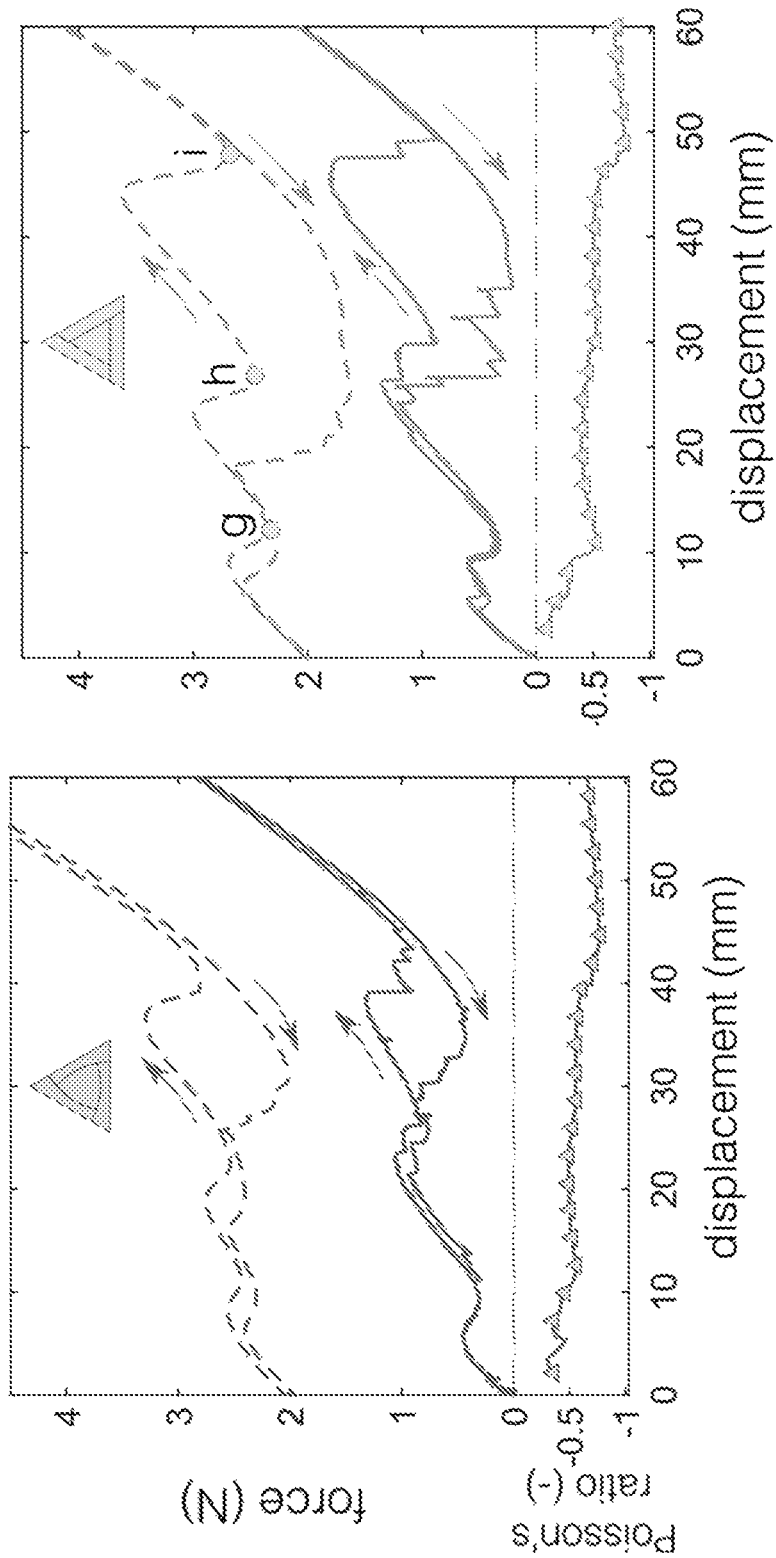

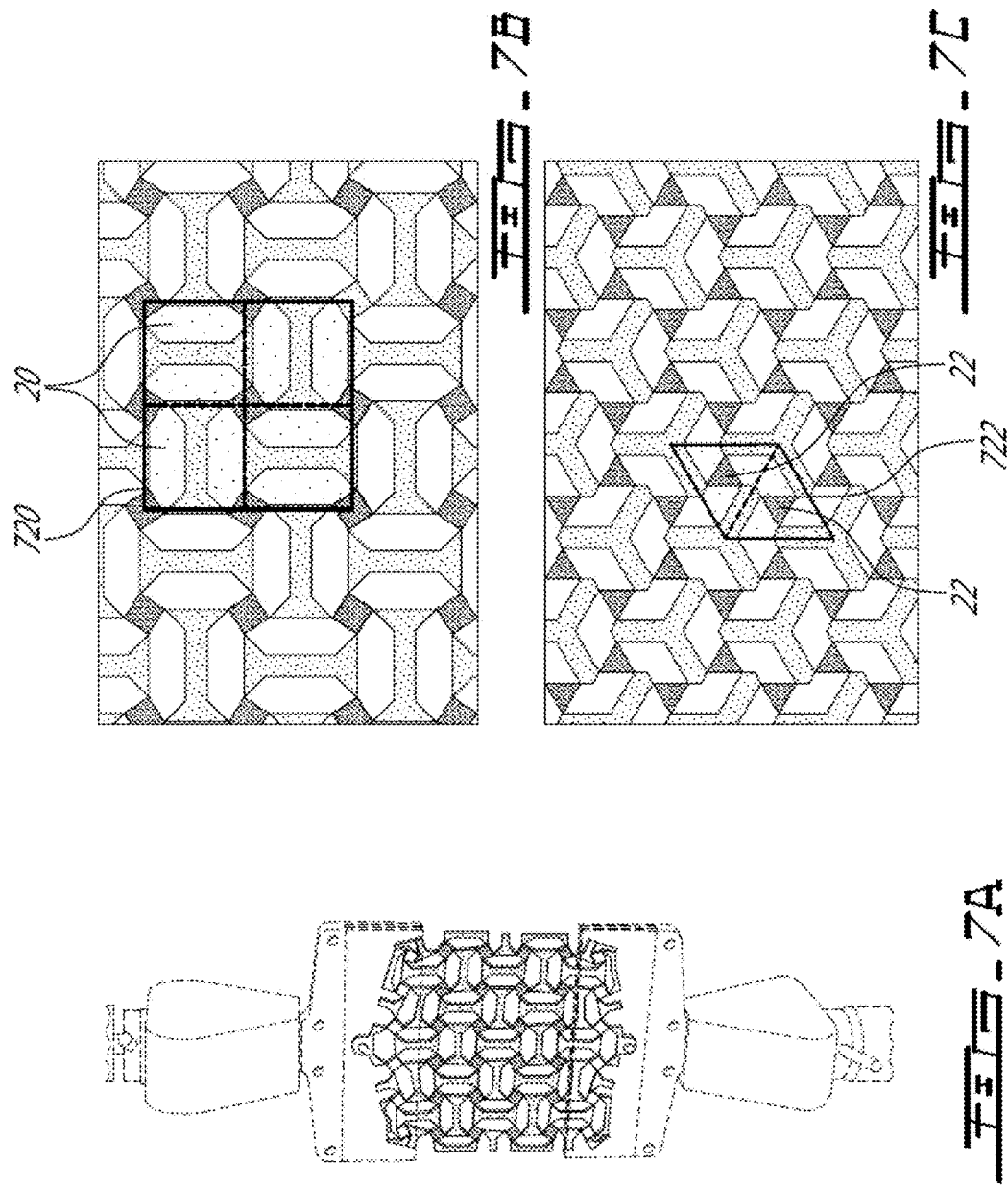

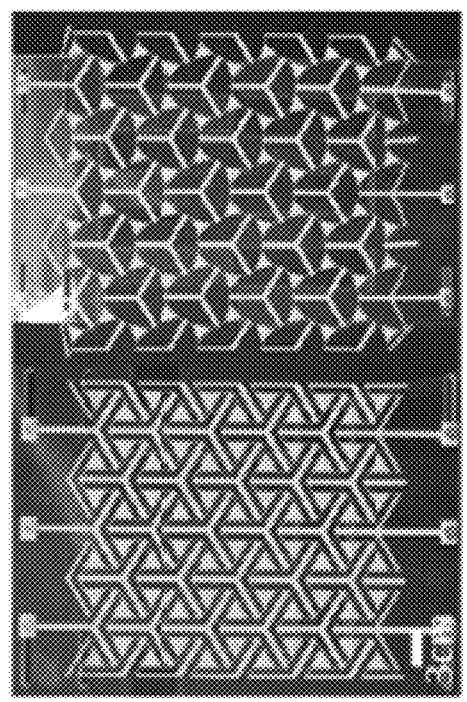
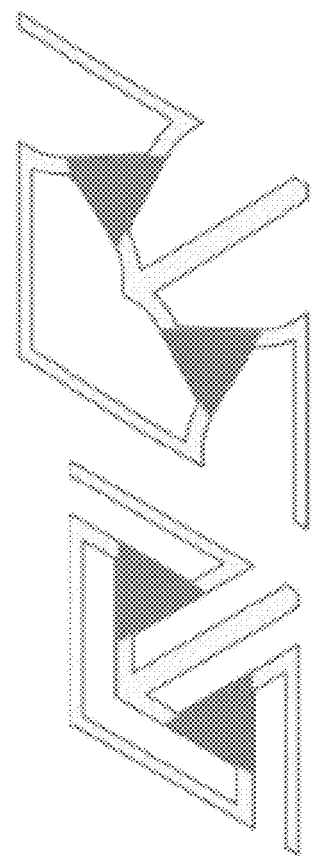
FIG. 9F
FIG. 9E

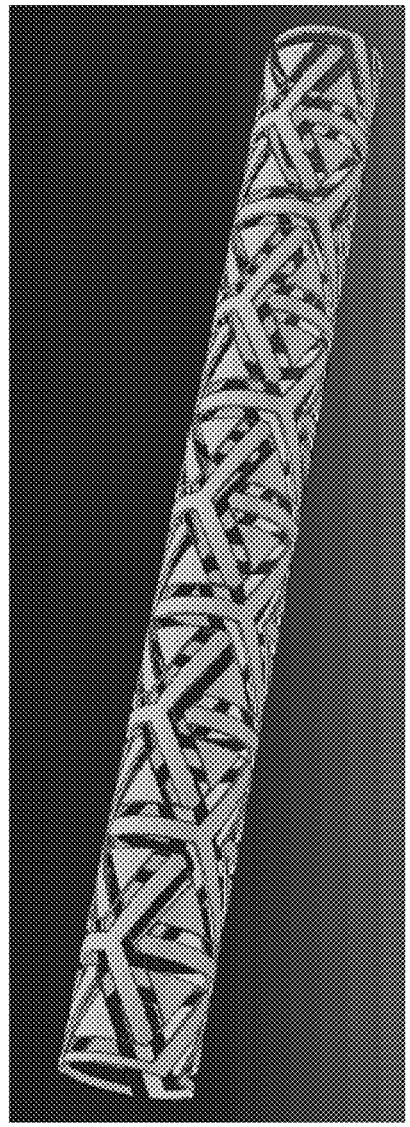 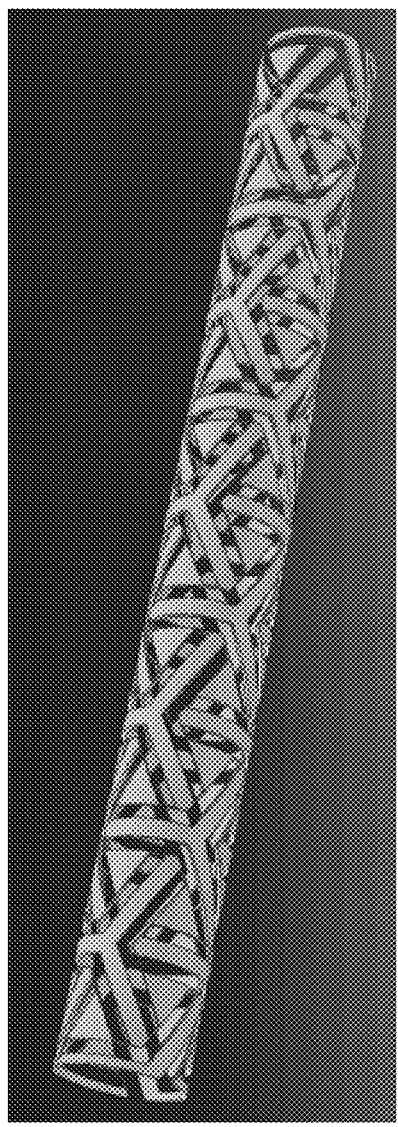
FIG. 18A
FIG. 18B

BISTABLE AUXETICS

CROSS-REFERENCE TO RELATED APPLICATIONS

The present application claims priority on U.S. patent application No. 62/344,675 filed Jun. 2, 2016, the entire content of which is incorporated herein by reference.

TECHNICAL FIELD

The application relates generally to mechanical metamaterials and, more particularly, to auxetics.

BACKGROUND

Metamaterials are materials engineered to have properties that do not occur naturally. Mechanical metamaterials are "designer" materials with exotic mechanical properties mainly controlled by their unique architecture rather than their chemical make-up. While a number of such mechanical metamaterials exist, one class of such mechanical metamaterials is known as auxetic materials (or simply "auxetics"). Auxetics are materials which have a negative Poisson's ratio. The Poisson's ratio (v) of any material is the ratio between the transverse strain $\varepsilon_t$ and the longitudinal strain $\varepsilon_l$ in the loading direction (wherein $v=-\varepsilon_t/\varepsilon_l$). Accordingly, for negative Poisson's ratio materials (i.e. v is negative) auxetics become wider and/or thicker, rather than thinner, when stretched. In other words, such auxetics which have a negative Poisson's ratio become thicker and/or wider in a direction perpendicular to the direction of the applied force.

A variety of geometrically-generated auxetics are known. In many cases, for example, a planar sheet of material may be perforated with a given geometric pattern in order to produce a geometric configuration which will enable an auxetic response (i.e. the planar sheet will get transversely wider, rather than thinner) when the material is stretched in a longitudinal loading direction. The planar sheet may for example be perforated with incisions extending in predetermined directions and patterns, thereby forming the predetermined geometric configuration in the material which will enable the desired auxetic response when a tensile force is applied to the material in a predetermined loading direction. The resulting auxetic behavior can be tuned (either isotropically or anisotropically) at targeted expandability, a feature that can be an asset for highly flexible and stretchable devices.

While the unusual behaviour of auxetics, governed by their negative Poisson's ratio, has been found to be well-suited for designing shape transforming metamaterials, there exists challenges with current auxetic designs that use monolithic materials, including the fact that they are "monostable" (i.e. they cannot maintain the transformed shape upon load removal). Existing auxetics that are obtained from such elastic monolithic materials therefore resume to their un-deformed configuration upon load removal.

Shape transformations using such monostable auxetic materials can be programmed by exploiting the nontrivial deformation modes pertinent to elastic instabilities. However, achieving shape alterations that are robust and stable is challenging, since a pre-stressed state has to be maintained in the structure to maintain its deformed shape.

SUMMARY

In one aspect, there is provided an auxetic metamaterial comprising a plurality of interconnected building blocks, the building blocks being deformable between a collapsed position and an expanded position upon the application of a load, the building blocks being bistable and defining a stable state in both the collapsed position and the expanded position, wherein in the stable state the building blocks maintain the collapsed position or the expanded position even after removal of the load applied on the building block.

In the auxetic metamaterial as defined above, a ratio of a local minimum strain energy of the building blocks in the expanded position, to a local maximum strain energy of the building block, may be less than one.

In the auxetic metamaterial as defined above, each of the building block may include: a rotating element having three or more vertex points, the rotating element being rotatable between a first fixed orientation and a second fixed orientation, the first fixed orientation corresponding to the collapsed position of the building block and the second fixed orientation corresponding to the expanded position of the building block; and three or more translating elements pivotally connected to the rotating element by corresponding hinges permitting relative rotation between the translating elements and the rotating element, each of the translating elements being pivotally connected to one of the vertex points of the rotating element by one of the hinges, and wherein translation of the translating elements away from the rotating element causes rotation of the rotating element from the first orientation to the second fixed orientation, and translation of the translating elements toward the rotating element causes rotation of the rotating element from the second fixed orientation to the first fixed orientation.

There is also provided a building block of an auxetic metamaterial, the building block comprising: a rotating element centrally disposed within the building block and having three or more vertex points, the rotating element being rotatable about a center of rotation between a first stable state and a second stable state, the rotating element maintaining a fixed orientation in each one of the first and second stable states in absence of load imposed on the building block; three or more translating elements disposed around the rotating element and pivotally connected thereto by hinges, each one of the translating elements being pivotally connected to one of the vertex points of the rotating element by a corresponding hinge to permit relative rotation between the translating elements and the rotating element; and the building block being deformable between a collapsed position and an expanded position, wherein the rotating element is disposed in the first stable state in said collapsed position and in the second stable state in the expanded position, and translation of the translating elements in respective opposed directions away from the center of rotation of the rotating element causes rotation of the rotating element from the first stable state to the second stable state, and translation of the translating elements in respective opposed directions toward the center of rotation of the rotating element causes rotation of the rotating element from the second stable state to the first stable state.

In a further aspect, there is provided a unit cell of an auxetic metamaterial, the unit cell comprising: a plurality of building blocks, each building block comprising: a rotating element centrally disposed within the building block and having three or more vertex points, the rotating element being rotatable about a center of rotation between a first stable state and a second stable state, the rotating element maintaining a fixed orientation in each one of the first and second stable states in absence of load imposed on the building block; three or more of translating elements disposed around the rotating element and pivotally connected thereto by hinges, each one of the translating elements being pivotally connected to one of the vertex points of the rotating element by a corresponding hinge to permit relative rotation between the translating elements and the rotating element; and the building block being deformable between a collapsed position and an expanded position, wherein the rotating element is disposed in the first stable state in said collapsed position and in the second stable state in the expanded position, and translation of the translating elements in respective opposed directions away from the center of rotation of the rotating element causes rotation of the rotating element from the first stable state to the second stable state, and translation of the translating elements in respective opposed directions toward the center of rotation of the rotating element causes rotation of the rotating element from the second stable state to the first stable state; wherein two adjacent building blocks are at least connected to each other by connecting a first translating element of a first building block to a second translating element of a second building block.

BRIEF DESCRIPTION OF THE DRAWINGS

Reference is now made to the accompanying figures.

FIGS. 1a-1f are schematic views of building blocks of an auxetic metamaterial (also referred to herein as bistable auxetic metamaterial (BAM)) according to particular embodiments of the present disclosure, each shown in both a collapsed (un-deformed) and an expanded (deformed) position.

FIGS. 2c-2f are schematic views of unit cells in the un-deformed and deformed states with square and triangular rotating elements for circular and parallel cut motifs.

FIGS. 3a-3f are schematic views of force-displacement curves during loading (tension) and unloading (compression) of building blocks for tilted, circular and parallel cut motifs of the auxetic building blocks of FIGS. 1a-1f.

FIGS. 3g-3l are schematic views comparing experimental and FE deformed shapes of triangular rotating elements with parallel cut motifs.

FIG. 7a is a schematic view of a uniaxial tensile test setup allowing lateral expansion caused by the negative Poisson's ratio of rotating units according to an embodiment of the present disclosure.

FIGS. 7b-7c are schematic views tracking corners of unit cells for square and triangular bistable auxetics building blocks.

FIGS. 9d-9f show a design of a rigid bistable auxetic metamaterial in accordance with an alternate embodiment that may be better suited for use with a more rigid material, such as elasto-plastic materials. FIGS. 9b and 10b show the building blocks of each of the respective bistable auxetic metamaterials, in both the collapsed (un-deformed) and an expanded (deformed) positions.

FIGS. 10a-10g depict detailed views of two different rigid corner profiles of the rigid BAM of FIGS. 9d-9f, showing stress evaluation results (FIGS. 10b-10c, 10e-10f), and an un-deformed and deformed sample (FIG. 10g).

FIGS. 16a-17b depict three dimensional (3D) geometries formed by the BAM as described herein, in the form of tubular lamp shades. FIGS. 16a and 17a depict two different BAM architectures in their respective closed or un-deformed position, and FIGS. 16b and 17b show the BAM architectures in their respective open or deformed positions.

FIGS. 18a-18c depict a stent formed by 3D BAM, shown in a closed (un-deformed) configuration in FIG. 18a, an expanded (deformed) configuration in FIG. 18c, and an intermediate, partially deformed, configuration in FIG. 18b.

DETAILED DESCRIPTION

Figure 1F:
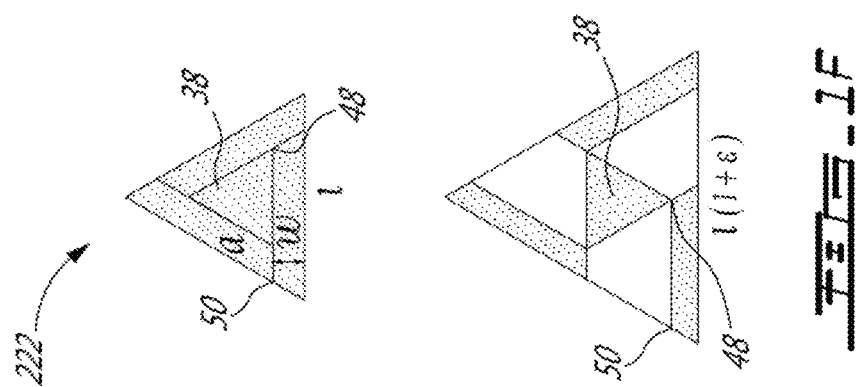

Before describing the details of the bistable or multi-stable auxetic metamaterials as provided herein, for the purposes of comprehension it is useful to begin with an overview of the material properties pertinent to the embodiments of the claimed invention(s) as described herein.

As noted above, the Poisson's ratio ($v=-\varepsilon_t/\varepsilon_l$) of any material is the ratio between the transverse strain ($\varepsilon_t$) and the longitudinal strain in the loading direction ($\varepsilon_l$). Accordingly, materials which exhibit a negative Poisson's ratio (i.e. $v$ is negative) typically become thicker and/or wider in a transverse direction when a force is applied in a longitudinal direction. Alternately, they may also simply maintain their existing size (e.g. thickness, width)—rather than get thinner—when a load is applied thereto.

The mechanical behavior of materials with dissimilar Poisson's ratios (v) can be very different. For three dimensional (3D) isotropic materials, Poisson's ratios v may generally satisfy $-1<v<0.5$ whereas for planar solids it is bounded between $-1$ and $1$, although for most solids, such as metals, polymers and ceramics, it varies in a narrower band, for example $0.25<v<0.35$, which makes the materials contract transversely to a longitudinal direction when stretched in the longitudinal direction. In contrast, materials and/or material structures with a negative Poisson's ratio exhibit the reverse deformation, as noted immediately above. Materials which have such a negative Poisson's ratio will be referred to herein as "auxetics", "auxetic materials", "auxetic metamaterial" "auxetic architected materials" (or simply "architected materials") and/or "auxetic structures". Regardless, these auxetic metamaterials expand transversely, relative to the longitudinal direction, when stretched in this longitudinal direction.

Unlike existing auxetics which are monostable, auxetic designs that are at least "bistable" (i.e. they are stable in at least two positions) and/or "multi-stable" (i.e. they are stable in multiple different positions) were arrived at by the present inventors. The auxetic configurations as described herein are therefore said to be at least "bistable", in that they can maintain one or more deformed shapes even after removal of the applied load. Many possible uses exist for the use of such bistable or multi-stable auxetic metamaterials. While the term "bistable auxetic metamaterials" will be used mainly herein, it is to be understood that the metamaterials described are at least bistable, and may in fact be stable in multiple (i.e. more than two) different positions or configurations.

The bistable auxetic metamaterials ("BAM"), alternately referred to as "bistable auxetic architected materials", as described herein are understood to be monolithic materials which have, or define, embedded architecture that permit them to function in the manner described. It is therefore to be understood that the bistable auxetic metamaterials as described herein are monolithic and thus do not include (and are not to be confused with) structures which consist of an assembly of separate and/or distinctly formed, elements/hinges/parts, etc.

Referring to FIGS. 1a-1f, a plurality of building blocks 20, 120, 220, 22, 122, 222 of a bistable auxetic metamaterials are shown. Each "building block", as referred to herein, is understood to be a single unit cell 24 which is capable of deformation (e.g. expansion or contraction) and which can be connected with a plurality of similar unit cells and/or building blocks to together form an auxetic metamaterial, and more particularly a bistable auxetic metamaterial (BAM) as described herein. The building blocks 20, 120, 220, 22, 122, 222 as described herein will deform only when a load is applied thereon, as will be described in further detail below, but they maintain their deformed shape upon removal of the applied load, as will be described.

The building blocks 20, 120, 220, 22, 122, 222 as described herein are a class of switchable architected metamaterials exhibiting simultaneous auxeticity and structural bistability. Each one of FIGS. 1a to 1f show the building block 20, 120, 220, 22, 122, 222 in a first stable state 26 or un-deformed state as a collapsed position, and a second stable state 28 or deformed state as an expanded position. In the embodiment shown, the building block 20, 120, 220, 22, 122, 222 has a smaller surface area in the collapsed position relative to the expanded position. The building block 20, 120, 220, 22, 122, 222 is able to maintain its shape and/or configuration in each of the stable states 26, 28. For example, if the building block 20, 120, 220, 22, 122, 222 is stretched into the expanded position, the building block remains expanded in the deformed second state 28 as long as no other loads are applied thereon. Advantageously, the building block 20, 120, 220, 22, 122, 222 can exhibit large and fully controllable and reversible shape transformations and/or deformations. The building block 20, 120, 220, 22, 122, 222 can retain the deformed configuration with no need of external loads or motors. The first un-deformed and second deformed stable states 26, 28 can be infinitely recovered with no compromise on the efficiency, integrity or life of the structure. In sum, the building block 20, 120, 220, 22, 122, 222 can be reconfigured to conform to applications based on its functionality.

In an alternate embodiment, the building block 20, 120, 220, 22, 122, 222 can have more than two stable states, for example a discrete number of intermediate stable states between the fully-collapsed first stable state 26 and the fully-expanded second stable state 28. Such multi stable states are possible if the flexural hinges 56 are not all of the same thickness. More particularly, by providing flexural hinges 56 of different thicknesses, regions within a given domain having multi-stable configurations can thus be introduced, whereby in each region the hinges of a given thickness snap through sequentially, for increasing magnitudes of the applied force for example. Thus, different groups of hinges (each group having a common hinge thickness, with the hinge thickness being different between groups) may thus "snap" at different load levels. Such a configuration thereby provides multi-stability of the resulting auxetic.

The building block 20, 120, 220, 22, 122, 222 can have any length 30 or size scale and therefore may be suitable for small-scale applications as well as large-scale applications.

In the embodiments shown, the building blocks 20, 120, 220, 22, 122, 222 all include a centrally located rotating element 32, which is surrounded by and connected to three or more translating elements 34. The term "centrally located" as used herein to define the position of the rotating element 32 refers to an approximate center location and/or a location within the building block between the translating elements. Relative movement between the rotating 32 and translating 34 elements deforms the building block 20, 120, 220, 22, 122, 222 between the collapsed and expanded positions.

The rotating element 32 has three or more vertex points 36 and is rotatable about a center of rotation 38 between the first stable state 26, defining the collapsed position, and the second stable state 28, defining the expanded position. The center of rotation 38 may be centrally located within the building block 20, 120, 220, 22, 122, 222 at approximately the center of the rotating element 32, however it is to be understood that the center of rotation of the rotating elements 32 need not be disposed at the precise center of the building block nor at a geometric center of the rotating element itself. Advantageously, because of the bistability characteristics of the building block 20, 120, 220, 22, 122, 222, the rotating element 32 maintains a fixed orientation in the first 26 and second 28 stable states in absence of load imposed on the building block 20, 120, 220, 22, 122, 222.

Figure 1E:
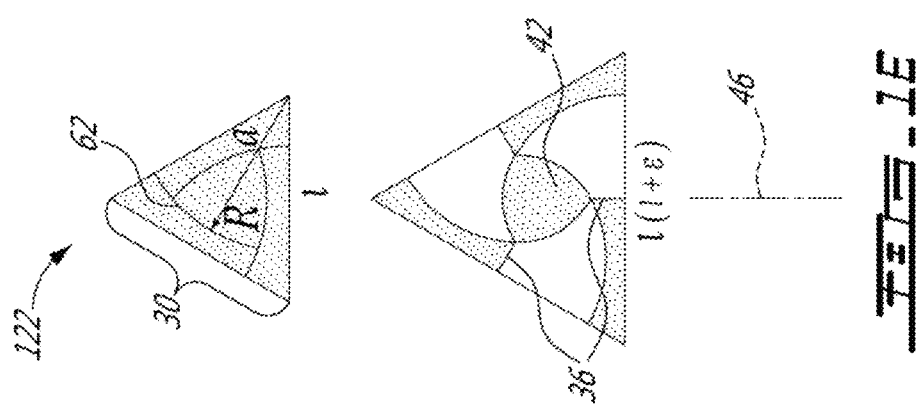
Figure 1D:
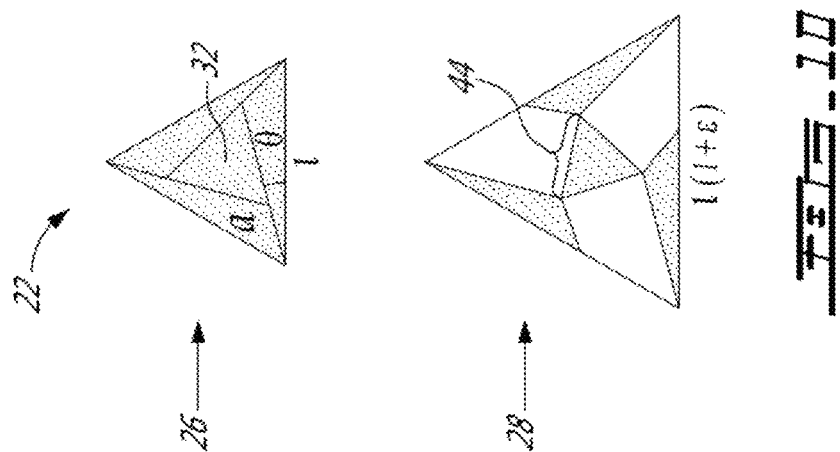
Figure 2A:
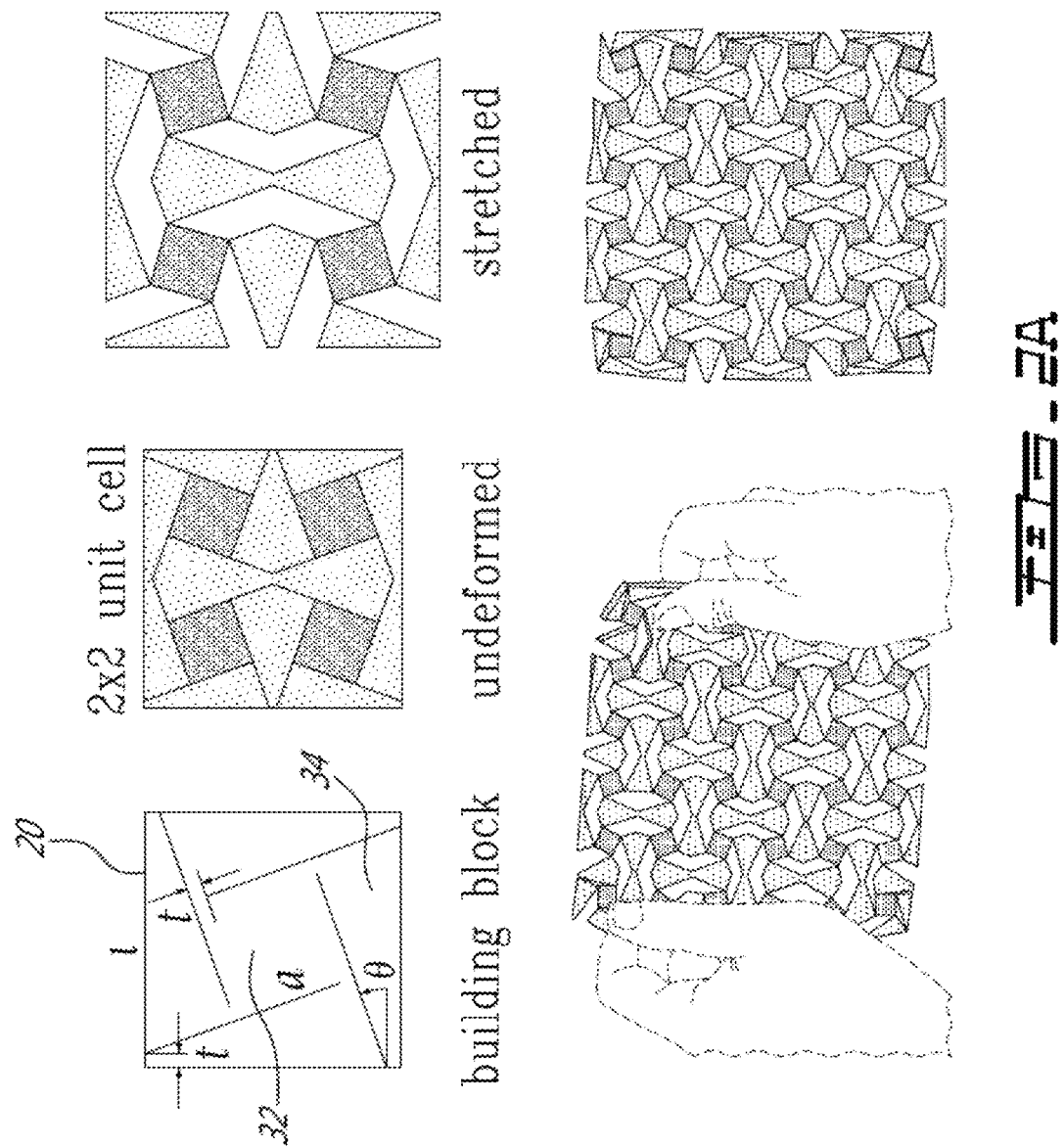
FIGS. 2a-2b are schematic views of square and triangular building blocks of the building blocks of FIGS. 1a and 1d, with their corresponding unit cells shown in the un-deformed and deformed states.
Figure 2B:
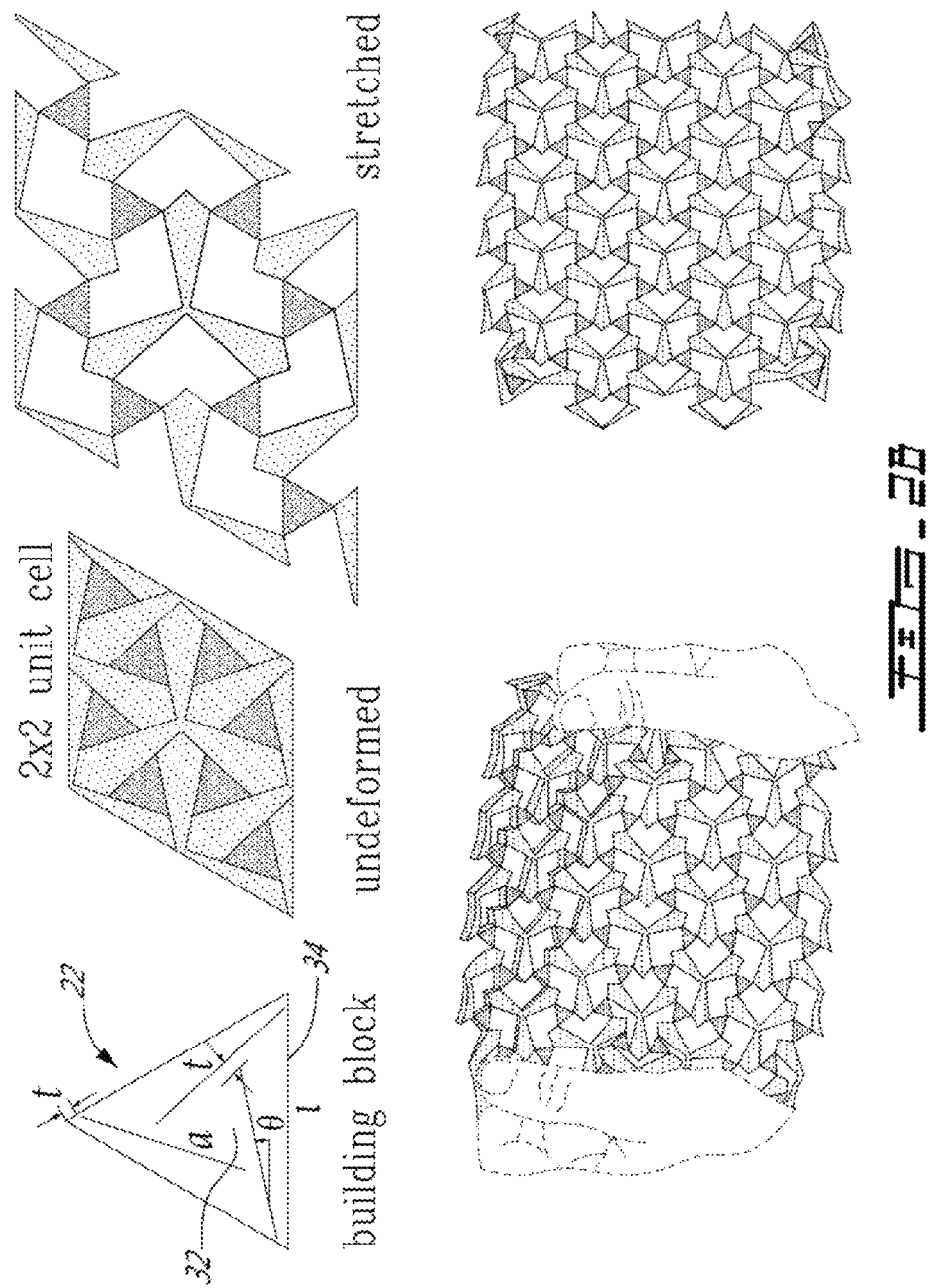

FIGS. 1a-1c show a square-shaped rotating 40 element with four vertex points 36 while FIGS. 1d-1f show a triangle-shaped rotating element 42 with three vertex points 36. In the case of the triangularly shaped rotating elements 42 of the embodiments of FIGS. 1d to 1f, (and therefore the triangular bistable auxetics formed thereby), each unit cell 722 (see FIG. 7) may be composed of two of the triangular building blocks 22, 122 or 222. In contrast, for the square shaped rotating elements 42 of the embodiments of FIGS. 1a to 1c (and therefore for the square bistable auxetics formed thereby), each unit cell 720 (see FIG. 7) may be composed of four of the square building blocks 20, 120 or 220.

In an alternate embodiment, the rotating element 32 can have other shapes, such as alternate polygonal shapes. For example, the rotating element 32 can have a hexagonal-shaped rotating element with six vertex points, and the like. It is to be understood that other shapes and geometries can be used to produce a similar bistable auxetic behaviour. While these rotating elements need not necessary be equilateral, their symmetry is believed to be important. Further, multiple different geometries may also be combined in a single building block and/or a unit cell. For example, rotating elements 32 having two different shapes (such as triangular and hexagonal, for example) may be provided in the same building block and/or unit cell which, when interconnected with similar building blocks and/or unit cells, form the bistable auxetic material. As such, domains may be patterned having dissimilar macro-geometry, such as hexagon, circular and any other desired shape which may be combined. While squared macro-geometry may be used in a particular embodiment, other regular and irregular macro-geometries remain possible.

Regardless, each of the rotating elements 32 has a normalized length or width a/l, which is defined as a ratio of a length 44 of a side of the rotating element 32 over the length 30 of a side of the building block 20, 120, 220, 22, 122, 222 in the collapsed position. In a particular embodiment, the normalized length ranges between 0.2 and 0.8. It is however to be understood that that specific values may be different for different designs (e.g. tilted vs. circular, for example).

In a particular embodiment, the building blocks 20, 120, 220, 22, 122, 222 can be formed by perforating various cut motifs into a monolithic sheet of suitable base material, thus creating a network of rotating elements 32 interconnected via the translating elements 34. Any number of possible base materials may be used, such as rubbers, metals, ceramics, plastics and/or polymers, and the like.

For example, in a particular embodiment, the rotating element 32 is defined by normal cuts (i.e. extending normally through the surface of the material) through a thickness of the building block 20, 120, 220, 22, 122, 222 into sheets of natural latex rubber using a laser cutter or other manufacturing processes, such as 3D printing and/or CNC machining. The thickness is defined along a transverse axis to a longitudinal axis 46. Each cut extends between two adjacent vertex points 36 of the rotating element 32 with a first end 48 of the cut located at a corresponding vertex point and an opposed second end 50 located at a corresponding side of the building block 20, 120, 220, 22, 122, 222.

In a particular embodiment, the building block 20, 120, 220, 22, 122, 222 is formed with three different motif designs, namely angled or tilted (FIGS. 1a and 1d), circular (FIGS. 1c and 1e), and parallel (FIGS. 1c and 1f). In the embodiment shown, the motifs are relative to the sides or edges of the building block. For example, the tilted motif is defined by an angle 52 between a side 54 of the translating element 34, the side 54 extends between a respective one 56 of the vertex point 36 and a respective corner 58 of the building block 20, 120, 220, 22, 122, 222, and a respective side 60 of the building block 20, 120, 220, 22, 122, 222. The parallel motif is defined by arcuate sides 62 of the rotating element 20, 120, 220, 22, 122, 222, each arcuate side 62 has a radius R defined from a respective corner of the building block. The parallel motif is defined by a corresponding side 64 of each translating element 34 that is parallel to a respective side 66 of the building block 20, 120, 220, 22, 122, 222.

The translating elements 34 are pivotally connected to the rotating element 32 by so-called "hinges" or "living hinges" 68. These living hinges are flexural hinges that are made of the same constitute material as the rest of the structure itself. As such, these hinges 68 are integrally formed with both the rotating element 32 and the translating elements 34. Or alternately stated, the hinges, the translating elements and the rotating elements are all integrally formed as a monolithic material having the presently described architecture. The hinge 68 can be any structural feature or region within the building block 20, 120, 220, 22, 122, 222 that permits the rotating element 32 to pivot or rotate relative to the translating elements 34. In a particular embodiment, the hinge 68 is monolithic with the rest of the building block 20, 120, 220, 22, 122, 222 and bend to induce the relative rotation between the rotating 32 and translating 34 elements. As a result, snap-through instabilities can occur, a phenomenon that brings together auxeticity and structural bistability. A normalized hinge thickness t/l is defined as a ratio of a thickness t of the hinge 68 between the vertex point 36 and an edge of the translating element 34 adjacent to the hinge 68 over the length l 30 of the side of the building block 20, 120, 220, 22, 122, 222 in the collapsed position. In a particular embodiment, the normalized hinge thickness t/l is between 0.01 and 0.09. These values, however, will depend on the design and constituent material.

In the embodiment shown, each one of the translating elements 34 is pivotally connected to one of the vertex points 36 of the rotating element 32 by a corresponding hinge 68 to allow relative rotation between the translating elements 34 and the rotating 32 element. The thickness t of these hinges 68 is selected to be sufficiently small so as to achieve bistability of the auxetic metamaterial before the material (from which it is made) yields—before the material deforms plastically with irreversible deformation. This may be particularly important if the material of the auxetics as described therein is not an elastic material, such as a rubber material. If the material is metal, however, the hinge thickness should be tailored to values that allow bistability to occur before yielding.

The translating elements 34 can have different shapes and sizes. In the embodiment shown, the translating elements 34 are non-rotating structures and have shapes complementary to adjacent shape of the rotating element 32 to achieve a compact structure in the collapsed position when the translating elements 34 are abutting the rotating element 32.

In use, a translation of each one of the translating elements 34 in a direction away from the center of rotation 38 of the rotating element 32 causes rotation of the rotating element 32 from the first stable state 26 to the second stable state 28 and an opposite translation of each one of the translating elements 34 in a direction toward the center of rotation 38 of the rotating element 32 causes rotation of the rotating element 32 from the second stable state 28 to the first stable state 26. When a load, for example a stretching load in the longitudinal axis 46, is applied to a collapsed building block 20, 120, 220, 22, 122, 222, the translating elements 34 move away from the center of rotation 38, thereby deforming the building block 20, 120, 220, 22, 122, 222 from the collapsed position to the expanded position.

The rotating element 32 maintains therefore the fixed orientation in the expanded position once the load is removed therefrom.

Referring to FIGS. 2a-2f, the building block 20, 22, and a corresponding unit cell are shown in collapsed and expanded positions. The translating elements 34 connect adjacent building blocks 20, 22 to form the unit cell. In the embodiment shown, two-by-two unit cells are shown by connecting four complementary building blocks 20, 22 to each unit cell. The building blocks 20, 22 are connected by connecting translating elements 34 from adjacent building blocks 20, 22. The unit cell form a class of auxetics, shown as structures using square and triangular rotating elements. These building blocks 20, 22 include patterns comprising four (FIG. 2a), or three (FIG. 2b), mutually intersecting lines nesting the square or triangle rotating element within a square or triangular building block, respectively. If the unit cell is pulled in one direction, as shown, the collective motion of its rotating element induces the unit cell to expand in the transverse direction, thereby giving rise to the negative Poisson's ratio, which for certain applications is desired, such as satellites, solar panels or resizable monitors or screens (including but not limited to, computer monitors, laptop screens, screens for mobile device (e.g. smartphones, tablets, etc.)) and the like.

Referring to FIGS. 3a-3f, a mechanical response to uniaxial loading showing force-displacement curves of auxetic bistable building blocks according to a particular embodiment is shown. The response is measured based on a study of the mechanical behavior of the building block to uniaxial tensile loading. The experiments of the study revealed that an initial linear region caused by the bending of the hinges is followed by a serrated force-displacement curve that accommodates most of the deformation. The saw-tooth serrations and the resulting negative stiffness behavior are mainly caused by snap-through buckling, from which the metamaterial bistability originates. At substantially full extension, the response is governed primarily by stretch-dominated deformation of the flexural hinges. The force-displacement curves obtained during loading and unloading cycles exhibit a large hysteresis loop (except for the tilted square pattern), although the response is fully reversible and the material can fully recover its un-deformed configuration upon unloading. The Poisson's ratio is negative through the full range of extension and approaches −1 upon the specimen full expansion. Performance of the building block can also be assessed through mechanical testing and predicted by a coherent set of finite element (FE) simulations and/or analysis.

Figure 3D:
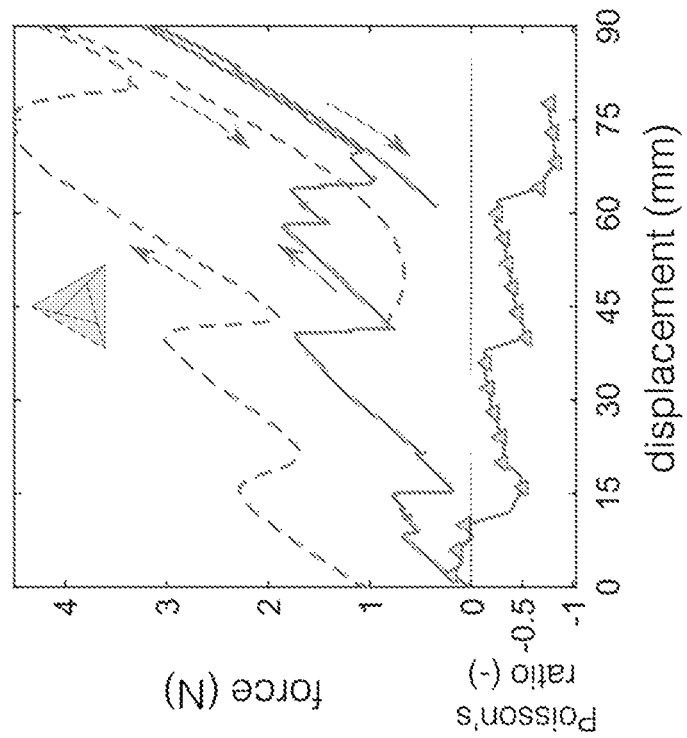
Figure 3C:
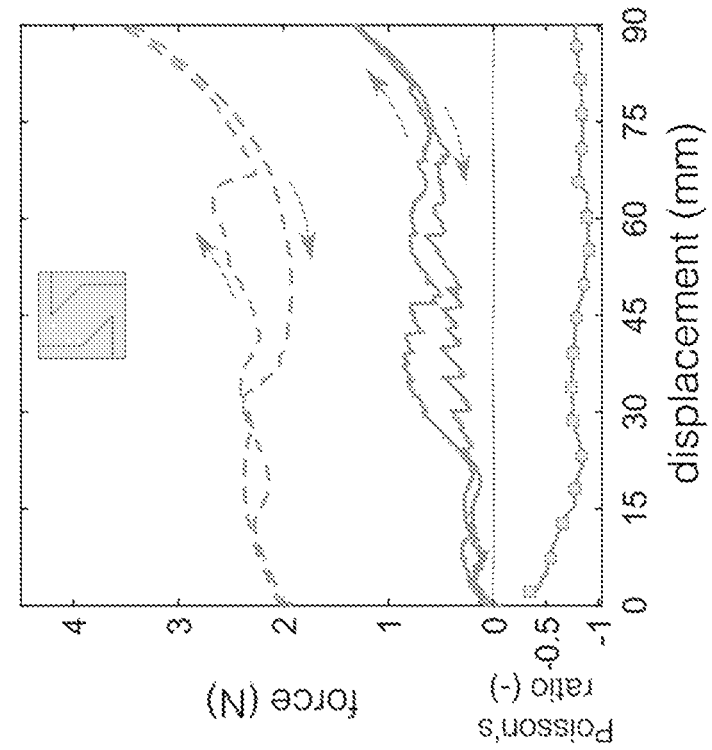
Figure 3G:
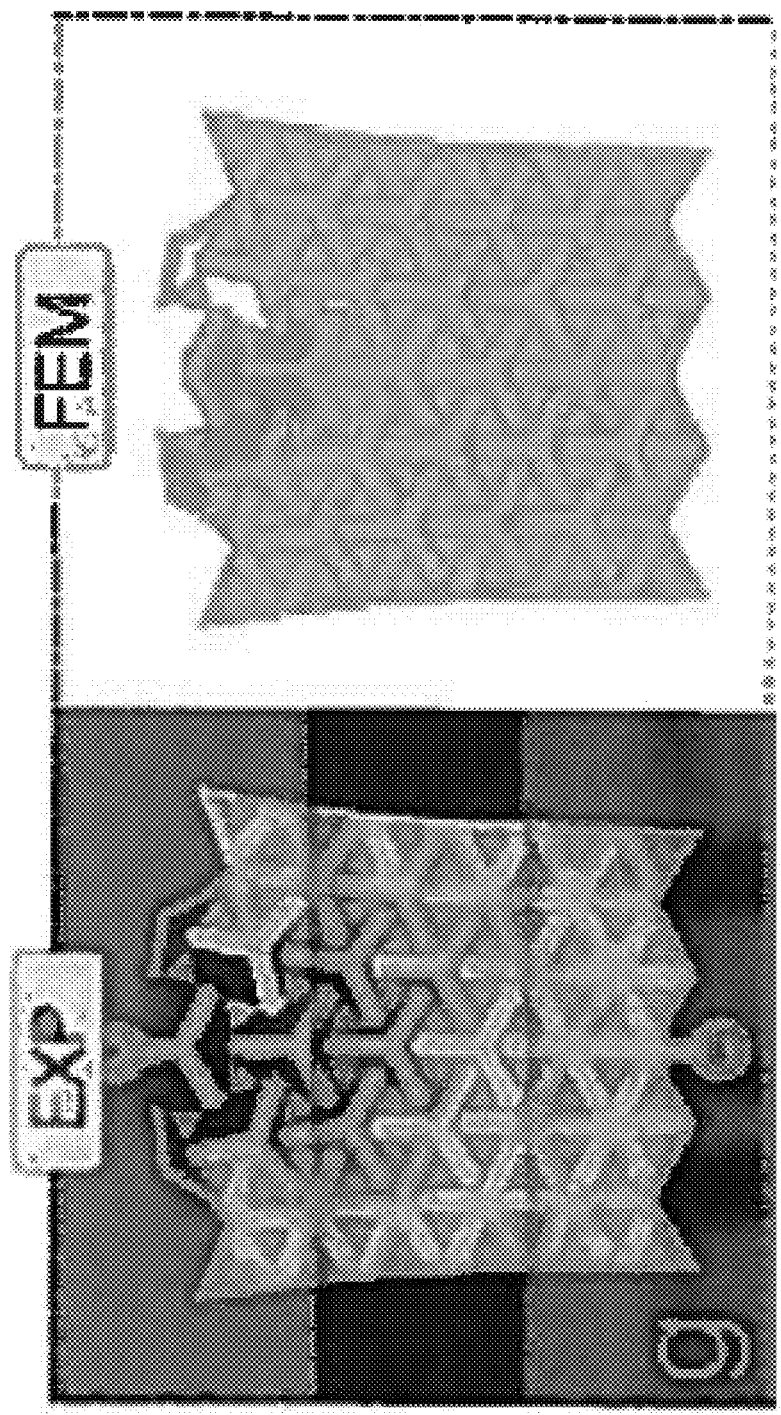
Figure 3H:
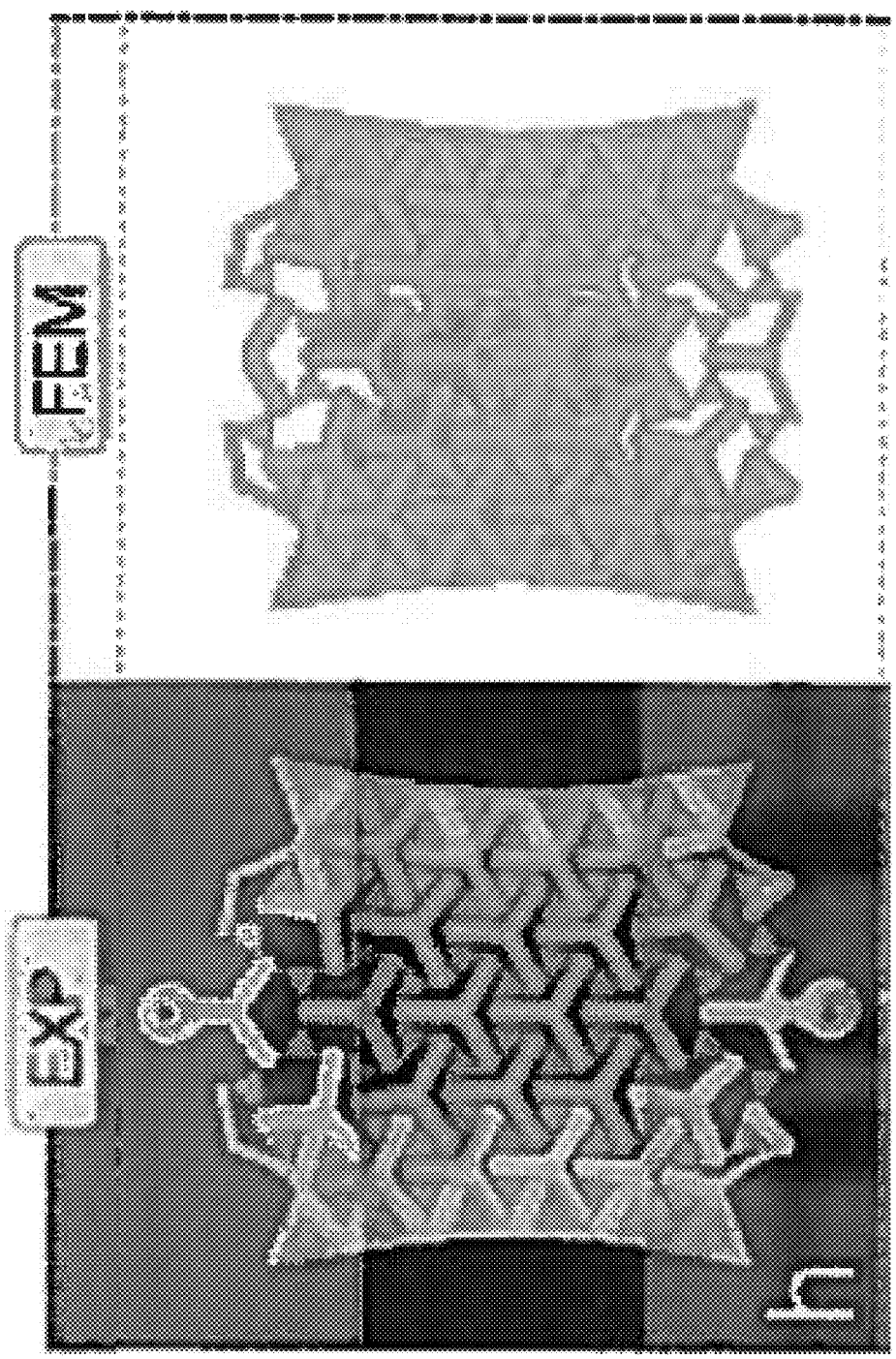
Figure 31:
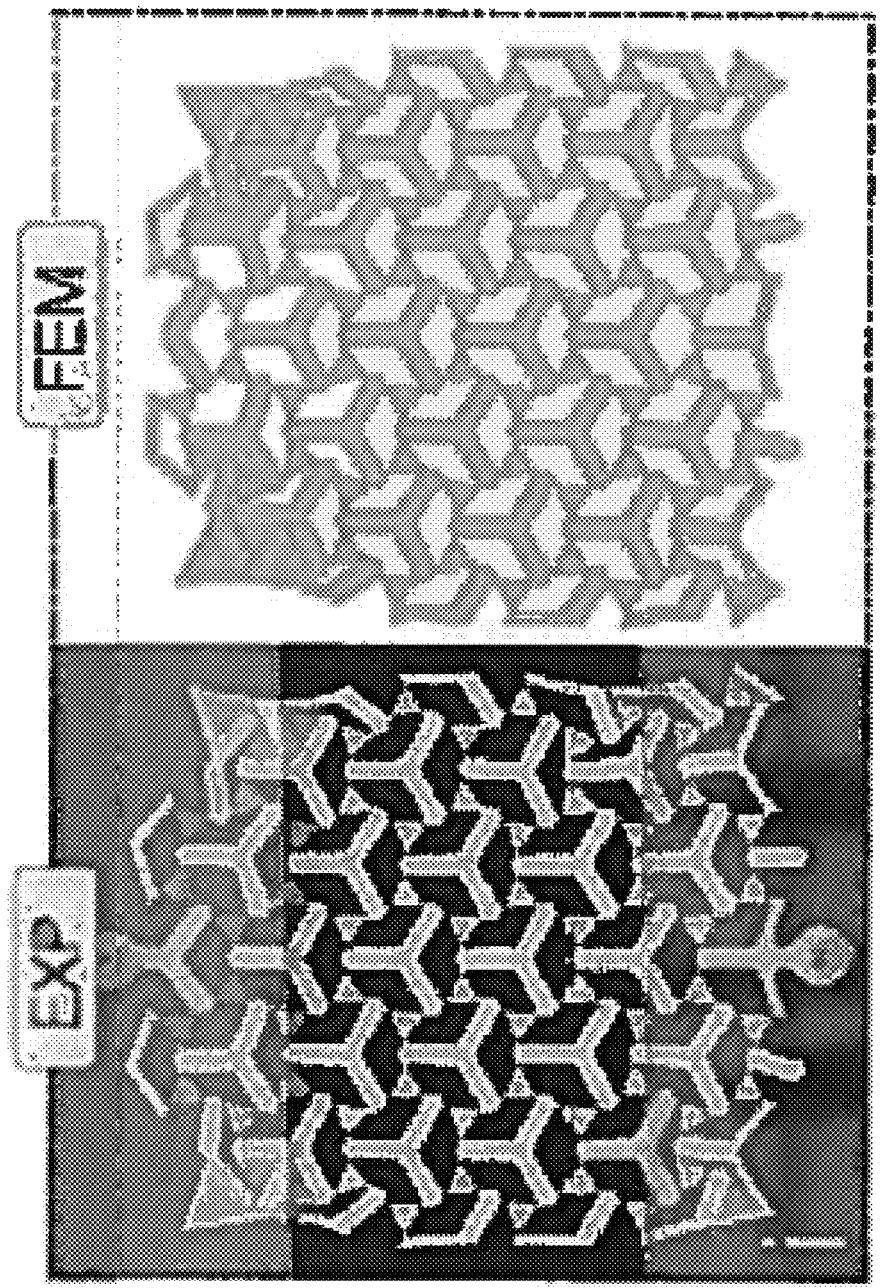

A nonlinear finite element analysis, "FE analysis", was also performed to further explore the mechanical phenomena observed in the experiments (further described in more details below under the Methods section). The force-displacement curves obtained by finite size FE models are quantitatively in agreement with the measurements reproducing the key trends observed in the experiments (FIG. 3a-3f, where dashed curves are offset along the y-axis for readability). Simulations revealed that contact may play a role in the performance of bistable auxetics. By introducing contact (i.e. abutment between the adjacent elements of the building blocks that move relative to each other), the translational and rotating elements thereof do not overlap in the course of the building block and/or unit cell deformation. Despite the simplified contact model used in the FE simulations, the predicted deformed shapes compare very well with those observed in the experiments (FIG. 3g-3i). Conversely, for the triangular design with tilted motif, the experiments showed that the auxetic metamaterial or metamaterial favors out-of-plane deformation before reaching full deployment, a response that is found to be energetically less expensive (i.e. it may be easier for the structure to jump out-of-plane to reach its second stable position) in comparison to the in-plane deformation enforced in the 2D model. In contrast, staying fully within the same plane, the structure may require more energy to permit the deformation. A move out of plane may thus be easier, because it requires less effort, and hence less energy than to remain in the plane of the sheet. Further still, the rotating elements may entangle if the out-of-plane deformation is impeded.

Referring to FIG. 4, a mechanical response of unit cells obtained by FE simulations according to a particular embodiment is shown. To gain further insight into the energetics of bistable auxetics while avoiding finite size effects, the response of a periodic unit cell subjected to uniaxial tension and released after full expansion was simulated. The stress-strain relationship, strain energy density, and Poisson's ratio of the material were simultaneously tracked. Following a linear region, the stress-strain curve becomes strongly nonlinear and the load drops below zero before returning to positive values. It appears that the energy landscape of the system possesses a local minimum at a non-zero deformation which is pertinent to the second stable state of the material. The Poisson's ratio is negative for the material designs observed in the experiments through the full range of the applied stretches, and interestingly it equals −1 at the second stable state.

Figure 5B:
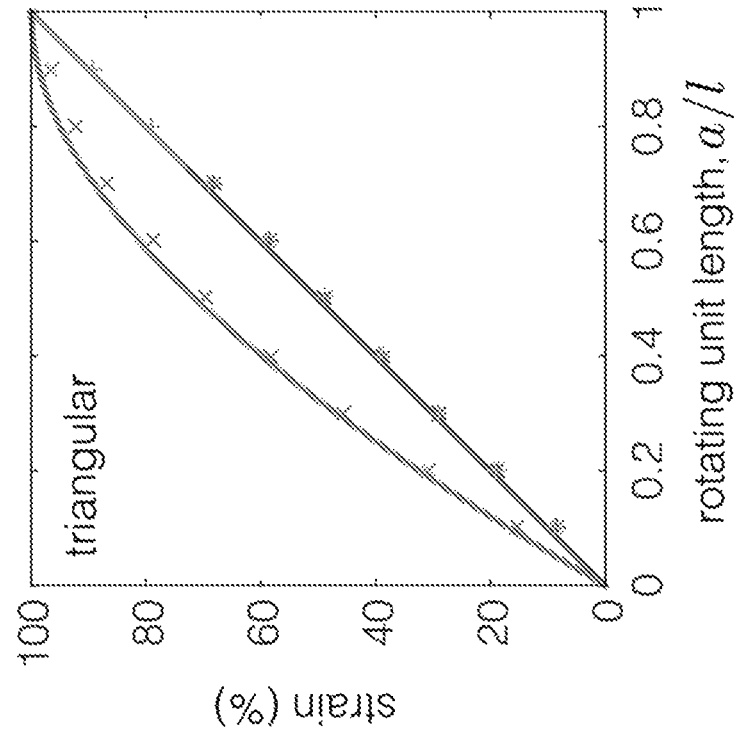
FIGS. 5a-5b are schematic views of geometric predictions of deformed stable states of metamaterials, respectively, for square and triangular rotating elements patterns with tilted, circular, and parallel cut motifs, compared with FE simulations.
Figure 5A:
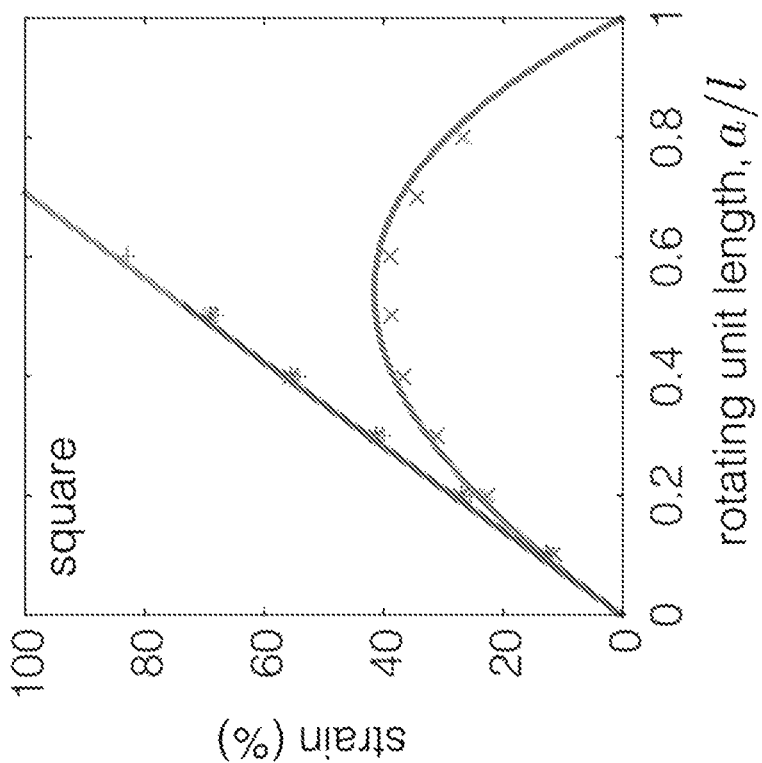

Referring to FIGS. 5a-5b, geometric predictions of deformed second stable state of metamaterials compared to FE simulations for thin hinges having a normalized thickness t/l=0.005 are shown. A kinematic analysis suggests that the two isolated stable states corresponding to the collapsed and expanded configurations of the metamaterial are permissible under the point hinge assumption. In practice, the flexure hinges may have finite thickness resisting the deformation induced by the rotational stiffness of the translating elements, and thus hinge thickness may need to be selected appropriately to ensure bistability.

The compliance and expandability of the designed metamaterials can be tuned by controlling the basic profile shapes of the building blocks. This prospect opens up multiple avenues for shape optimization of profiles for desired performance. It was observed that the structural bistability of the metamaterials relies on the hinge thickness, or the normalized thickness t/l, and the width of the rotating unit, or the normalized length a/l. This observation was carried out by determining a ratio of the local minimum strain energy of the building block pertinent to the deformed stable state of the metamaterial to its local maximum strain energy (often known as the energy barrier), i.e. $\eta = E_{min}/E_{max}$. More specifically, in one particular embodiment, this ratio of a local minimum strain energy of the building block in the expanded position (i.e. its deformed state) to a local maximum strain energy (i.e. the energy barrier) of the building block may be less than 1.

Figure 5D:
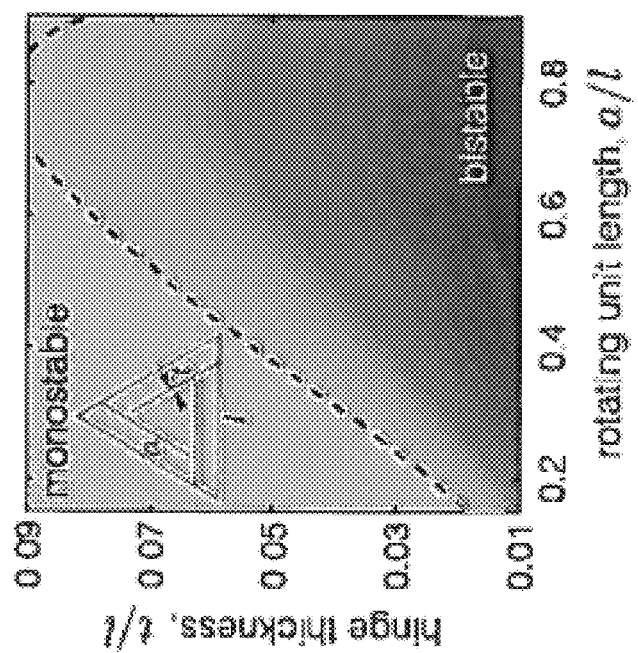
FIGS. 5c-5d are schematic views of phase diagrams obtained by FE simulations, respectively, for square and triangular metamaterial designs with parallel cut motif.
Figure 5C:
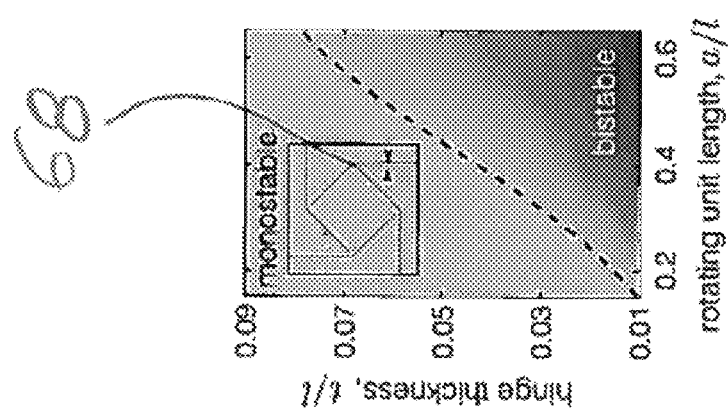
Figure 5E:
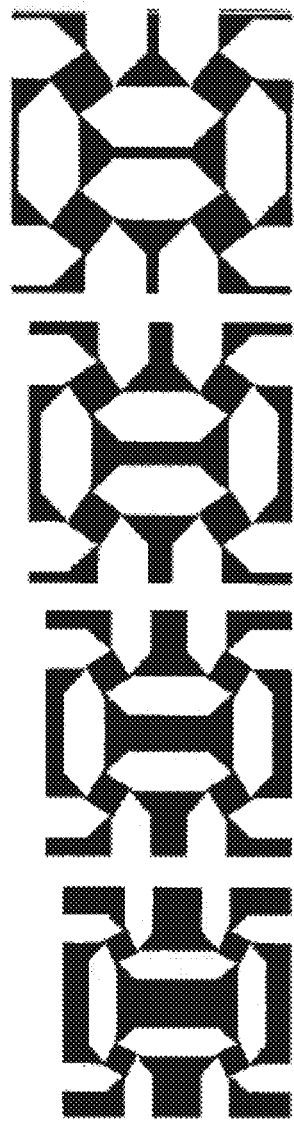
FIGS. 5e-5f are schematic views of stable deformed states of square and triangular bistable auxetics unit cells with parallel cut motif at selected lengths (a/l).
Figure 5F:
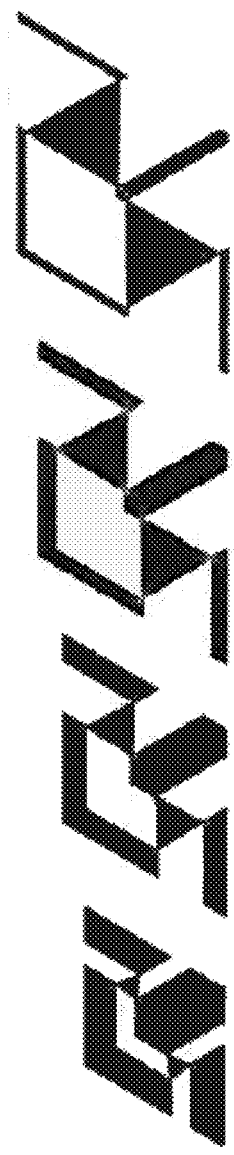

Referring to FIGS. 5c-5d, phase diagrams for square and triangular metamaterial designs with parallel design motif demonstrating the relationship between metamaterial bistability and the normalized hinge thickness t/l and the normalized length of the rotating element a/l are shown. The contours show the ratio of the local minimum (stable deformation) to the peak (barrier) of the strain energy $\eta = E_{min}/E_{max}$. For $\eta < 1$, the metamaterial is structurally bistable. This spectrum sheds light on the appearance of transition states in the parameter space, which shows bistability for $\eta < 1$ and metastable behavior for $\eta=1$ (FIG. 5c, 5d and FIG. 8). Referring to FIGS. 5e-5f, the distribution of the principal strains at the stable deformed state shows that the strain localizes mainly at the hinges with negligible deformation in the rest of the structure.

Methods

Material and Fabrication.

The specimens used for testing were fabricated by perforating a 3/16" thick sheet of natural latex rubber using a laser cutter with an approximate cut width of 200 μm. The mechanical response of the rubber material was found to be well-captured using a nearly incompressible Mooney-Rivlin model, whose strain energy is described by $W=C_{10}(I_2-3)+C_{01}(I_2-3)+K/2(J-1)^2$ with $C_{10}=110$ kPa, $C_{01}=81$ kPa and assuming $K=2500\mu$ where $\mu=2(C_{10}+C_{01})$ is the initial shear modulus.

Figure 6:
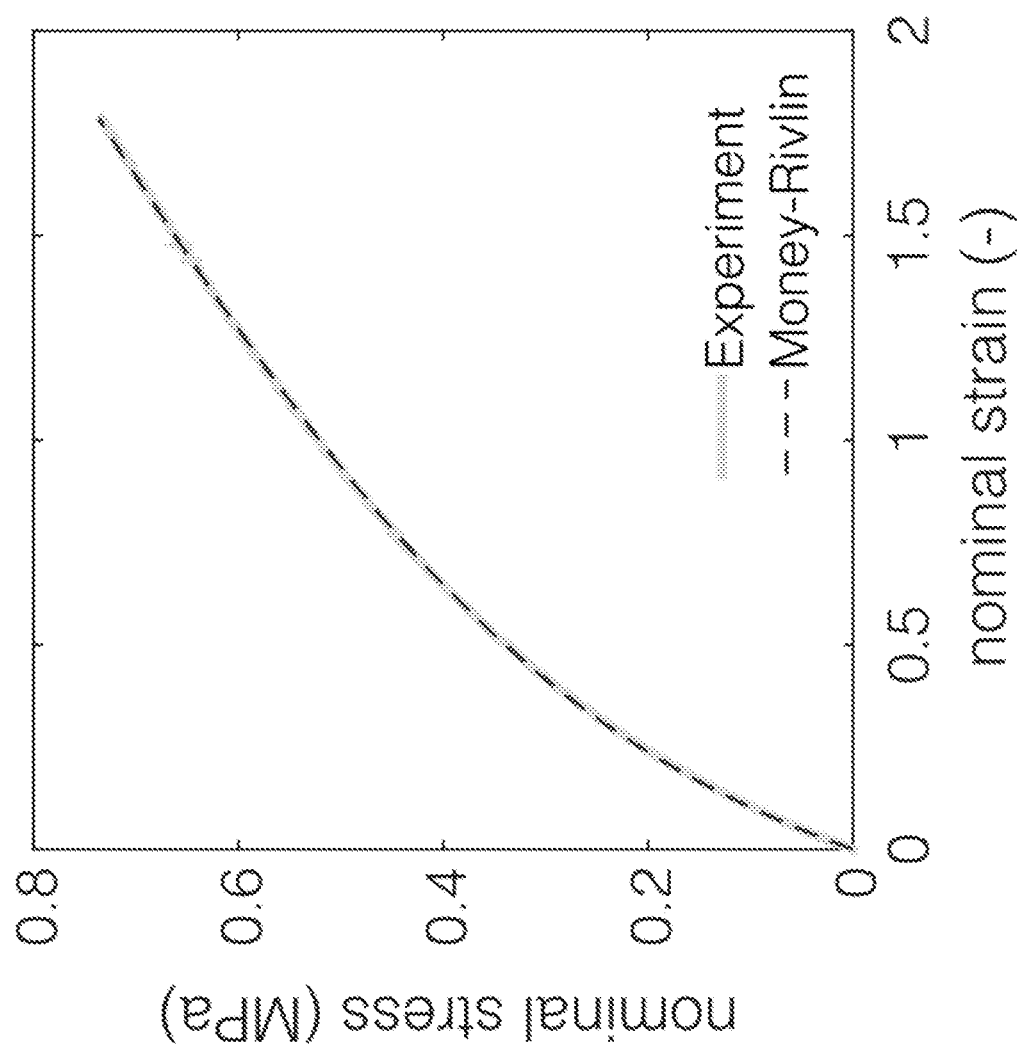
FIG. 6 is a schematic view of a comparison between experimental and Mooney-Rivlin fit for the nominal stress-strain curve of a natural latex rubber material.

The stress-strain curve of the rubber is given in FIG. 6 where the strain energy is described by $W=C_{10}(\bar{I}_1-3)+C_{01}(I_2-3)+K/2(J-1)^2$ where $\bar{I}_1=J^{-2/3}$ trB and $\bar{I}_2=\frac{1}{2}J^{-4/3}[(trB)^2-tr(B^2)]$, $B=FF^T$, $J=detF$ and F is the deformation gradient.

Experimental Methods.

The specimens were fixed in a customized clamp equipped with two plates for guiding lateral expansion, and the force was measured under displacement controlled condition at the rate of u=10 mm/min using a MTS INSIGHT tensile tester. The deformations of samples were recorded using a high resolution digital camera facing the specimens from which the Poisson's ratio was calculated by tracking the corners of the unit cells located in the middle of the specimen. The procedure was implemented in the image processing toolbox of MATLAB as shown in FIG. 7b-7c.

Simulations.

Finite element simulations were performed using the nonlinear FEM package ABAQUS 6.12. All models were discretized with modified quadratic plane stress elements (CPS6M). For single unit cell models, periodic boundary conditions were applied. The motifs were introduced into a solid model by embedding seam cracks with duplicate overlapping nodes along the edge between the rotating and translating elements. Since the experimental samples underwent large deformations, the geometric nonlinearities were taken into account. A simplified contact law was assigned to the model with a hard contact for normal behavior and a frictionless tangential behavior. The simulations were performed with ABAQUS Standard Implicit Dynamics solver with moderate dissipation which exhibits improved convergence when contact is present.

Referring to FIG. 6, a comparison between experimental and Mooney-Rivlin fit for the nominal stress-strain curve of the natural latex rubber material. The material constants of the fitted model are $C_{10}=110$ k Pa and $C_{01}=81$ kPa. It was assumed that $K=2500\mu$ where $\mu=2(C_{10}+C_{01})$ is the initial shear modulus of the rubber.

Experiments

Using the experimental method described above, the Poisson's ratio was determined from the homogenized strains of each unit cell, as follows:

$$v = -\frac{\varepsilon_x}{\varepsilon_y}$$

$$\varepsilon_x = \frac{a_x B_y - b_x A_y}{A_x B_y - B_x A_y} - 1$$

$$\varepsilon_y = \frac{b_y A_x - a_y B_x}{A_x B_y - B_x A_y} - 1$$

where the components of the lattice vectors spanning the unit cell in the un-deformed (A;B) and the deformed configurations (a;b) are given as $$A_x = \frac{1}{2}(X_2 - X_1 + X_3 - X_4), A_y = \frac{1}{2}(Y_2 - Y_1 + Y_3 - Y_4),$$

$$B_x = \frac{1}{2}(X_4 - X_1 + X_3 - X_2), B_y = \frac{1}{2}(Y_4 - Y_1 + Y_3 - Y_2),$$

$$a_x = \frac{1}{2}(x_2 - x_1 + x_3 - x_4), a_y = \frac{1}{2}(y_2 - y_1 + y_3 - y_4),$$

$$b_x = \frac{1}{2}(x_4 - x_1 + x_3 - x_2) \text{ and } b_y = \frac{1}{2}(y_4 - y_1 + y_3 - y_2).$$

The Poisson's ratio values reported for square designs (FIG. 3a-3c) are the mean values of four (4) unit cells and those for triangular designs (FIG. 3d-3f) are the mean values of twelve (12) unit cells located in the middle of the specimens.

Geometric Model

Figure 4A:
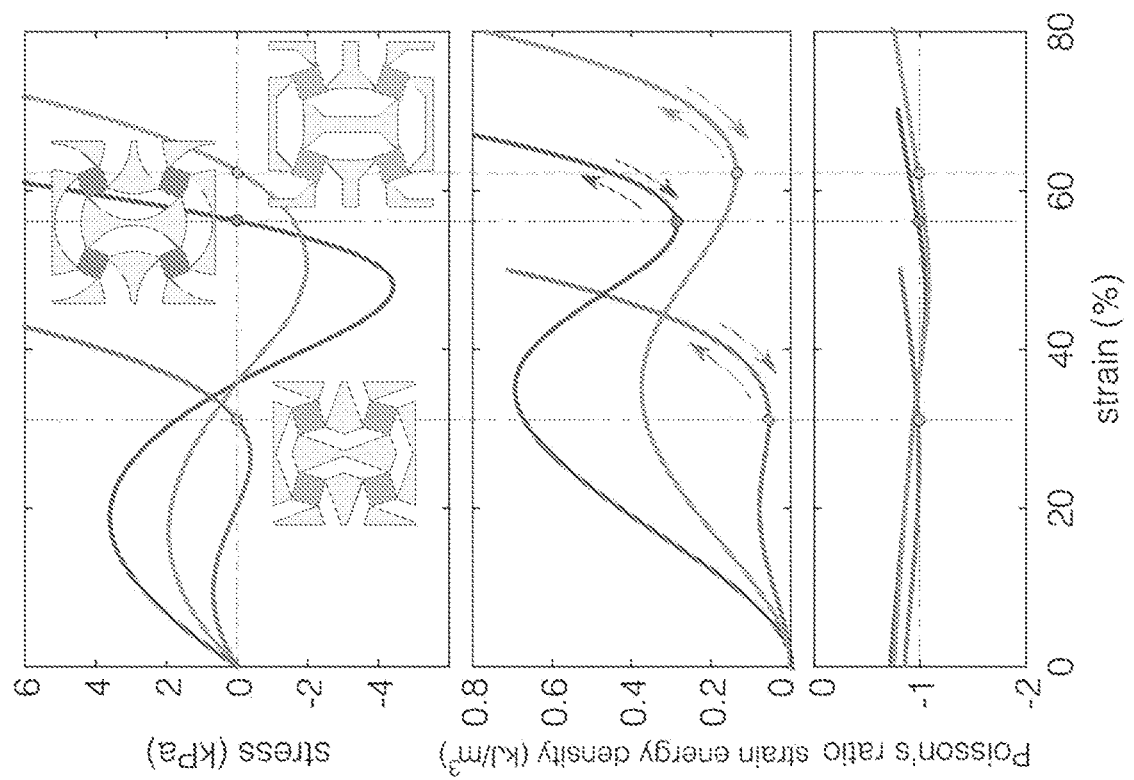
FIGS. 4a-4b are schematic views of stress, strain energy density, and Poisson's ratio versus strain, respectively, for square and triangular unit cells with tilted, circular, and parallel cut motifs calculated by FE simulations under periodic boundary conditions.
Figure 4B:
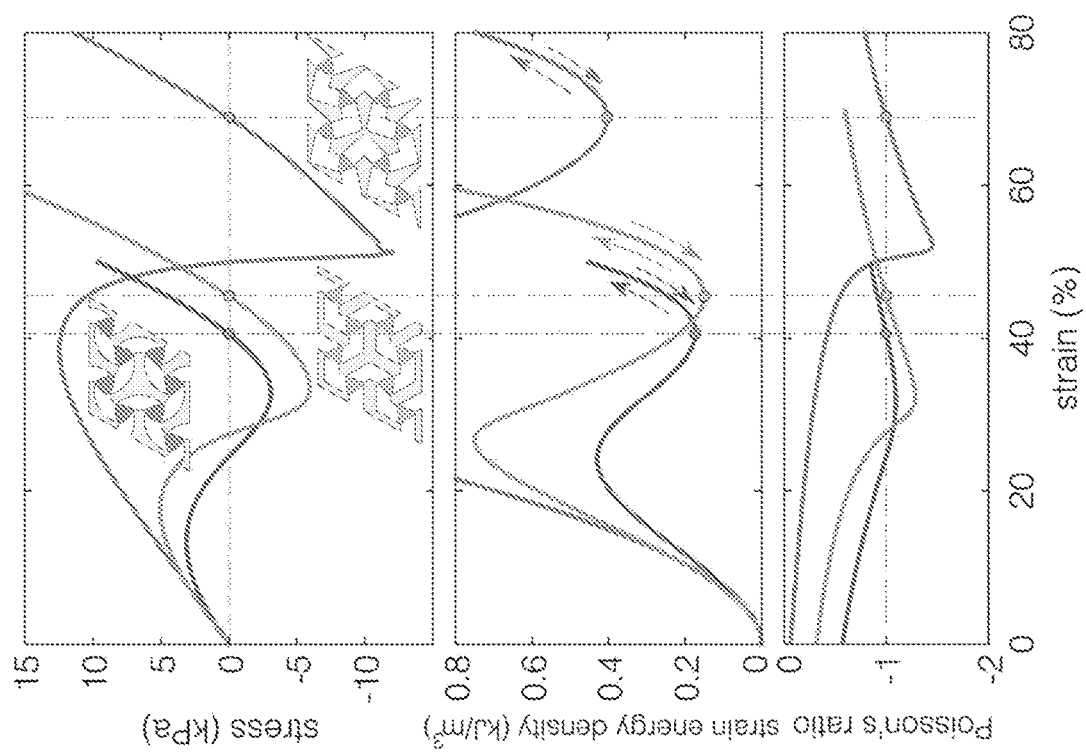

A geometric model is developed (FIGS. 1a-1f) for square and triangular metamaterials for three design motifs based on the point hinge assumption with results presented in FIGS. 4a and 4b. For the square designs (FIGS. 1a-1c), the geometry of tilted motif is defined by the angle $\theta \in [0,\pi/4]$, that of circular motif by the normalized radius $R/l \in [1/\sqrt{2}, 1]$, and for parallel cuts by the width parameter $w/l \in [0, \frac{1}{2}]$. The normalized length of the rotating unit is given by:

$a/l = \cos\theta - \sin\theta$ for tilted, $a/l = (-1+\sqrt{4(R/l)^2-1})/\sqrt{2}$ for circular; and $a/l = (1-2w)/\sqrt{2}$ for parallel motifs.

The strain at full expansion is given by $\varepsilon = 2a\sin\theta$ for the tilted motif, and $\varepsilon = \sqrt{2}a$ for both circular and parallel motifs.

For the square designs, if $$a/l = 1/2, \theta = \arctan\left(\frac{\sqrt{7}-1}{\sqrt{7}+1}\right) \simeq 24°,$$

$$R/l = \frac{1}{2}\sqrt{5/4+\sqrt{2}} \simeq 0.99 \text{ and}$$

$$w/l = \frac{1}{4}(2-\sqrt{2}) \simeq 0.146$$

in the above mentioned motifs.

Likewise, for the triangular designs, the geometry is defined by the angle $\theta \in [0, \pi/6]$ for tilted motif, the normalized radius $R/l \in [\sqrt{3}, \sqrt{3}/2]$ for circular motif, and the width parameter $w/l \in [0, \sqrt{3}/6]$ for parallel cuts.

The normalized length of the rotating unit equals to $a/l = \cos\theta - \sqrt{3}\sin\theta$, $a/l = (-1+\sqrt{12(R/l)^2-3})/2$ and $a/l = 1-2\sqrt{3}w$ for tilted, circular and parallel cut motifs, respectively.

The strain at full expansion is given by $\varepsilon = 2a\sin(\theta+\pi/6)$ for tilted motif and $\varepsilon = a$ for both circular and parallel motifs. Here, when $$a/l = 1/2, \theta = \arctan\left(\frac{\sqrt{3}(\sqrt{5}-1)}{3\sqrt{5}+1}\right) \simeq 15.5°,$$

-continued $$R/l = \sqrt{7/12} \simeq 0.76 \text{ and}$$
$$w/l = \sqrt{3}/12 \simeq 0.144.$$

Energetics

Figure 8A:
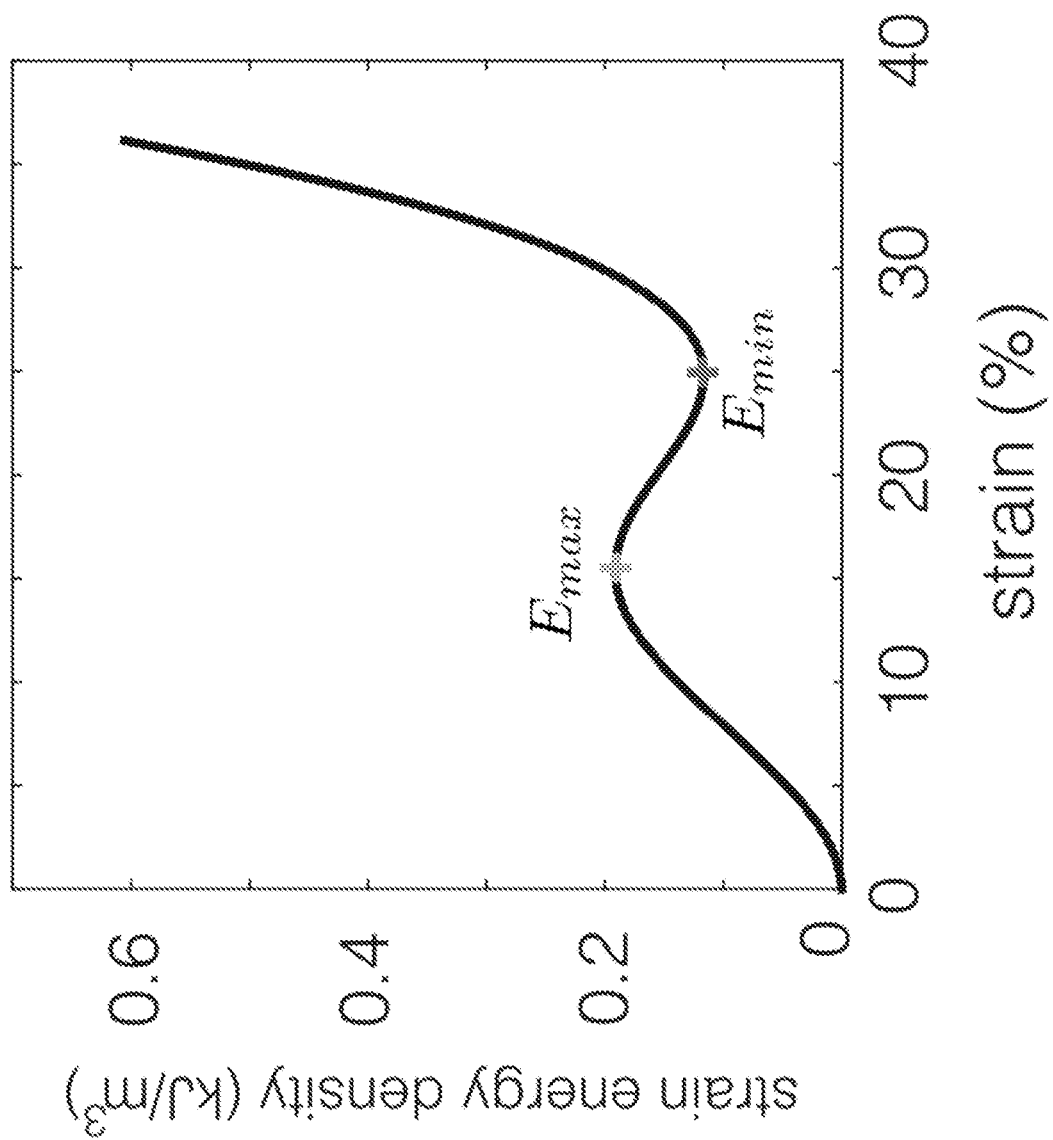
FIG. 8a is a schematic view of an example of strain energy density versus applied strain and demonstration of local minimum (bistability) and maximum (barrier) energy for a triangular design with circular cuts.
Figure 8B:
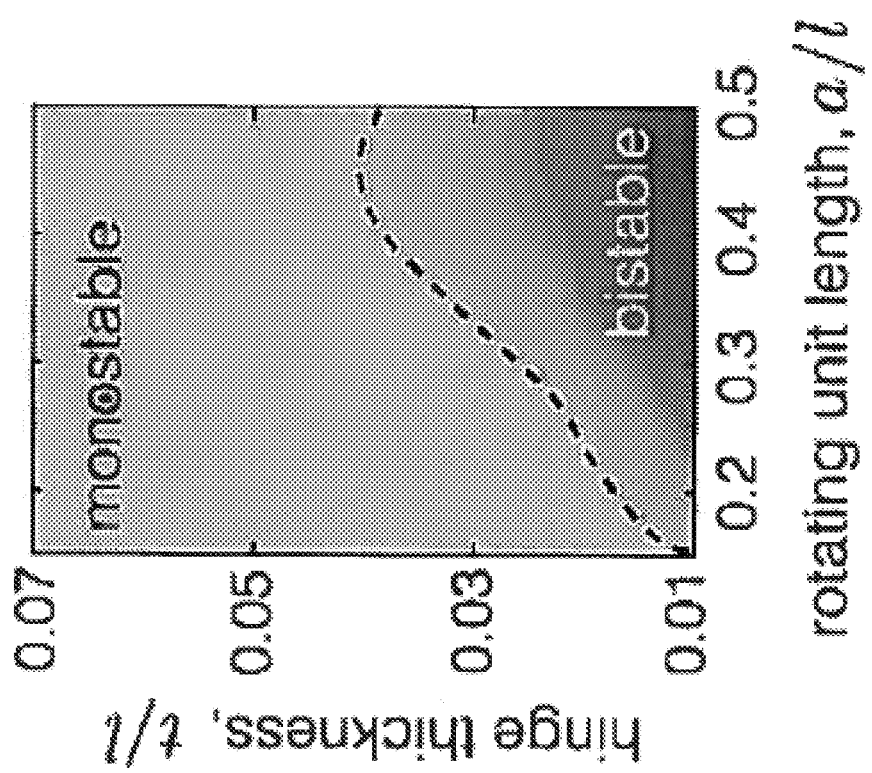
FIGS. 8b-8c are schematic views of phase diagrams, respectively for square and triangular metamaterial designs with circular cut motif.
Figure 8C:
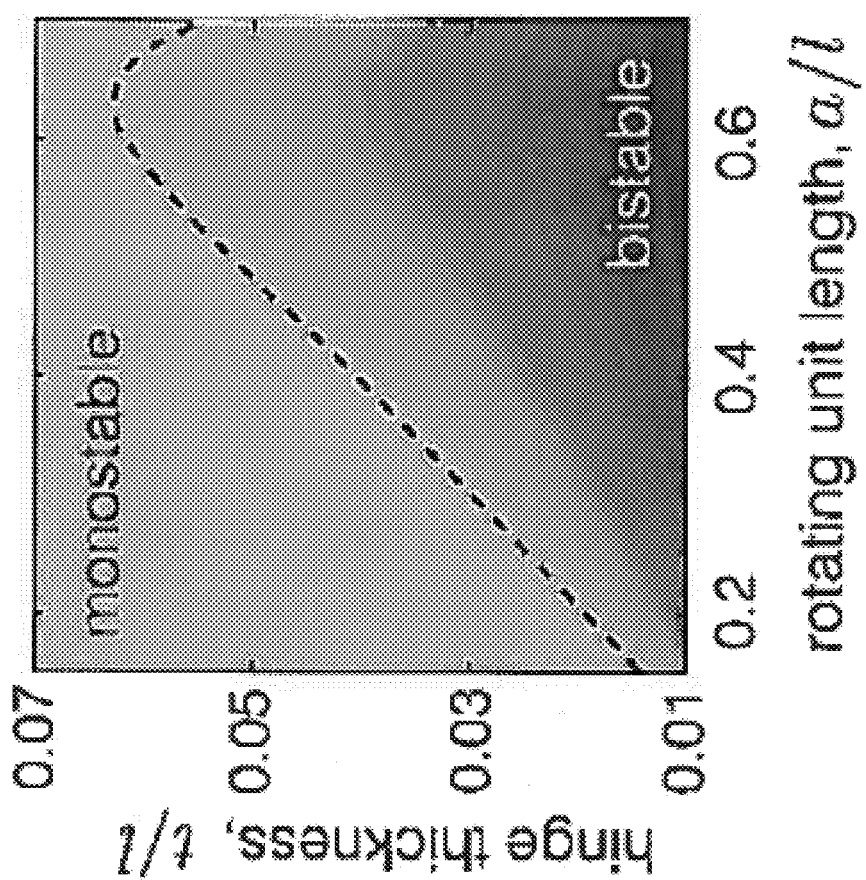

In the prototypes that were tested in the experiments, the hinges consisted of finite ligaments that can deform and resist rotating element rotation. The thickness of these flexural hinges can play a key role in the structural stability of the metamaterials. A parametric study was performed to assess the relation between the structural bistability and the factors controlling the unit cell geometry, in particular the hinge thickness t/l and the width of the rotating element a/l (FIGS. 5c and 5d). The ratio of the local minimum strain energy was calculated at the deformed stable state of the structure/architected material to its strain energy barrier, i.e. $\eta = E_{min}/E_{max}$ (FIG. 8a). For $\eta<1$, the metamaterial is structurally bistable. The phase diagrams of structural bistability states for square and triangular designs with circular motifs are shown in FIGS. 8b and 8c.

In use, the building block can present a class of planar mechanical metamaterials exhibiting a switchable expandability. The combined structural bistability and negative Poisson's ratio in two dimensions adds another dimension to the design space of architected soft materials. Expandability, stiffness and bistability of metamaterials can be conveniently controlled by varying the geometry of the basic profiles of the rotating and translating elements. This strategy can be exploited to design new deployable monolithic materials at multiple length scale that do not require load control after deployment, flexible devices, medical implants to treat stenotic lesion in body vessels, wearable skin sensors with tunable mechanical properties, resizable monitors or screens (including but not limited to, computer monitors, laptop screens, screens for mobile device (e.g. smartphones, tablets, etc.)), to name but a few potential applications.

BAM Made of Rigid Solids

With reference to FIGS. 9a to 15b, bistable auxetic metamaterials (BAM) having gaps made of rigid solids, in accordance with an alternate embodiment of the present disclosure, will now be described.

While the bistable auxetic metamaterials described in the embodiments above may be composed of an elastomer material, which provides them with the ability to withstand large deformation, certain advantages may exist by providing a BAM that is designed for use with more rigid, elasto-plastic materials, such as rigid polymers and metals. BAM realized solely out of elastomers may lack the stiffness, strength, high melting and/or high softening temperature points that might be required by certain applications. Compared with elastomer-based BAMs, so-called "rigid" BAM made of rigid elasto-plastic materials, such as rigid polymers and metals, may therefore have greater potential to be used in such applications.

The inventors have therefore sought to realize a BAM architecture out of rigid elasto-plastic materials, such as metals. Unlike elastomers which can undergo large deformation prior to failure, rigid elasto-plastic materials allow very limited deformation before failure, which make the work very challenging.

One of the challenges of using rigid materials for BAM is their limited amount of deformation to failure compared with elastomer. This challenge may however be at least partially addressed and/or overcome by introducing buckled thin ligaments with profiles optimized to reduce stress concentration, thus delaying failure induced by repeated load. A combination of simulations and experiments were used by the inventors to assess the performance of such solid rigid BAM configurations with results showing a resistance to failure of more than 10000 cycles.

Figure 9B:
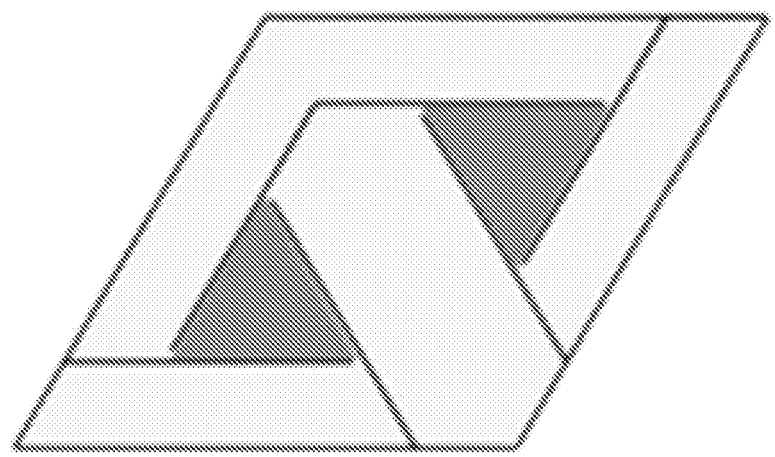
FIGS. 9a-9c depict a design of a bistable auxetic metamaterials that may be suitable for use with an elastomeric material.
Figure 9A:
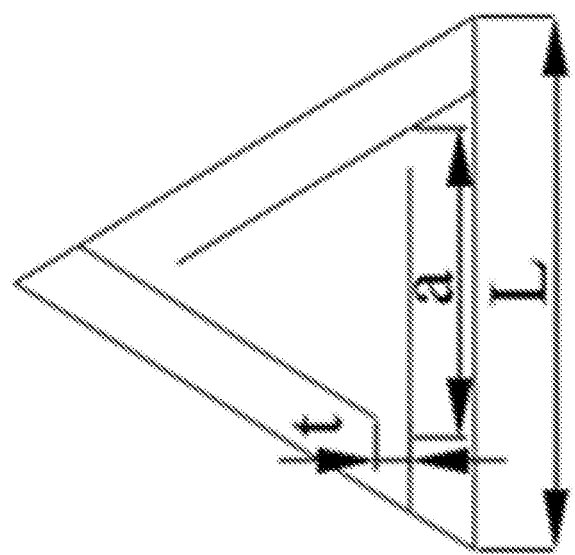
Figure 9D:
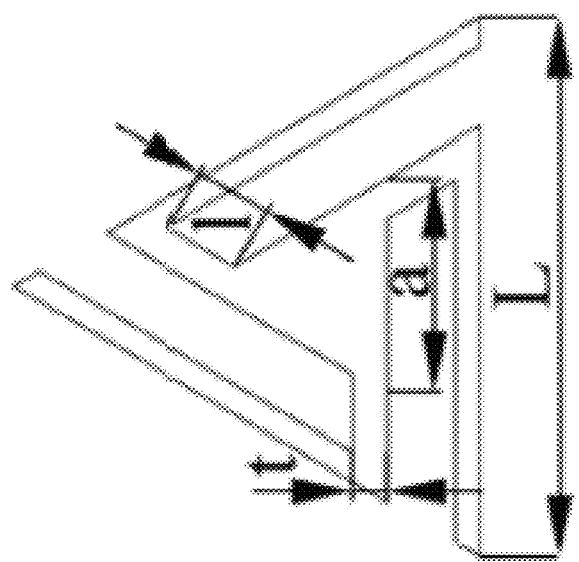
Figure 9C:
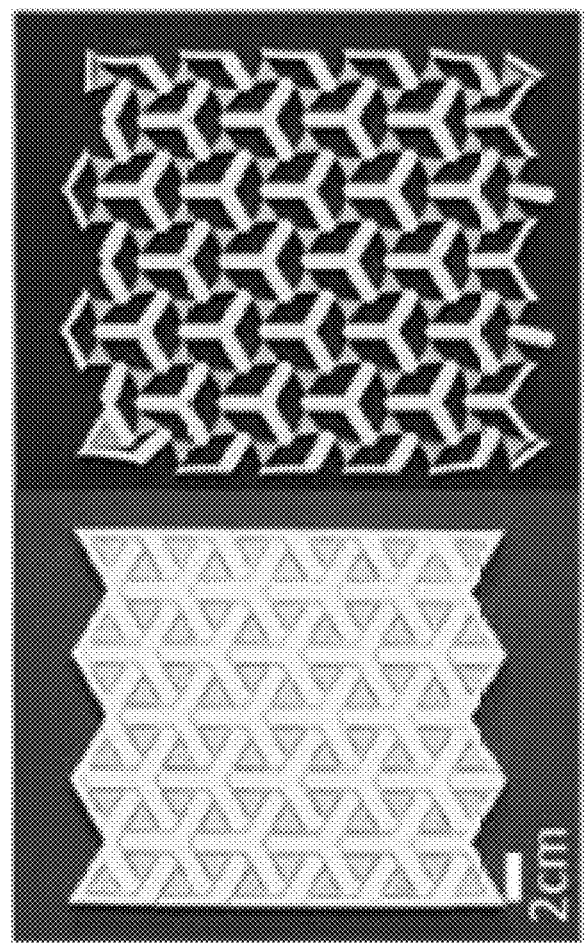
Figure 10B:
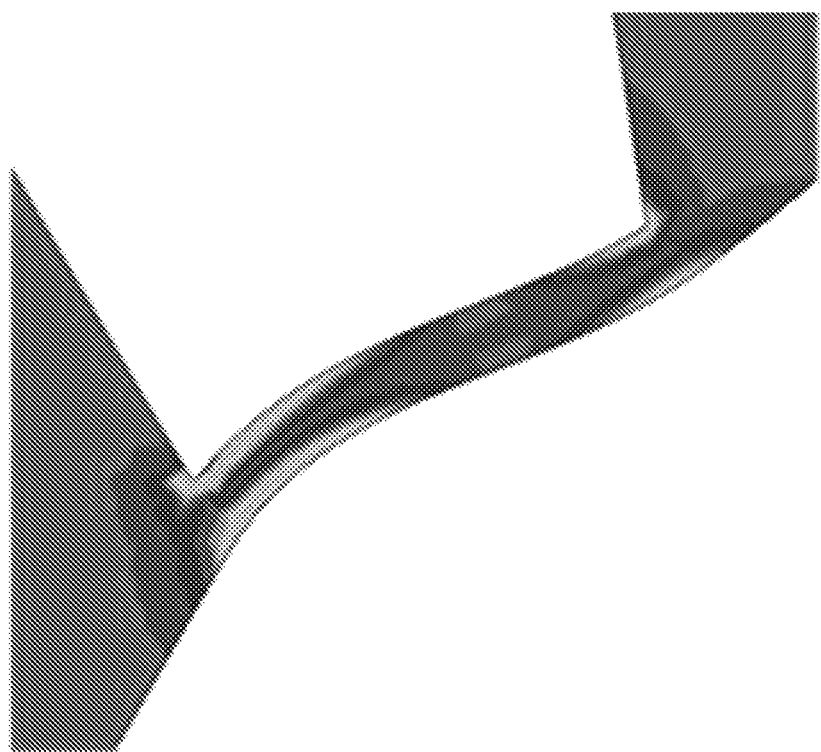
Figure 10A:
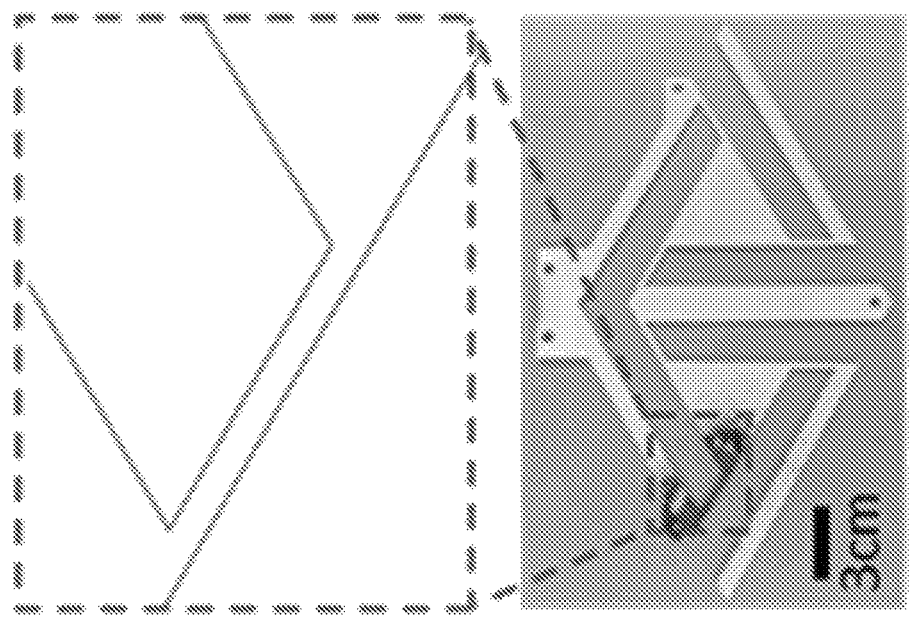
Figure 10D:
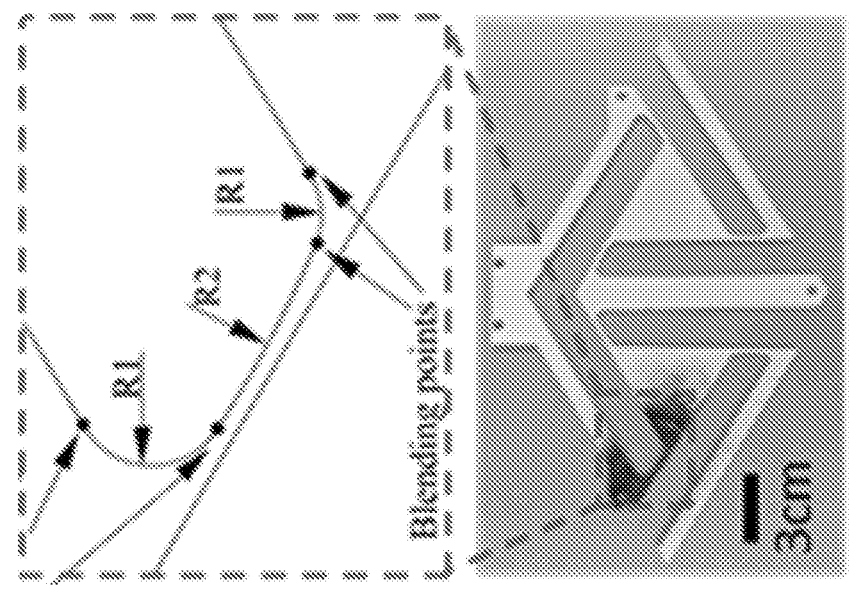
Figure 10C:
Figure 10F:
Figure 10E:
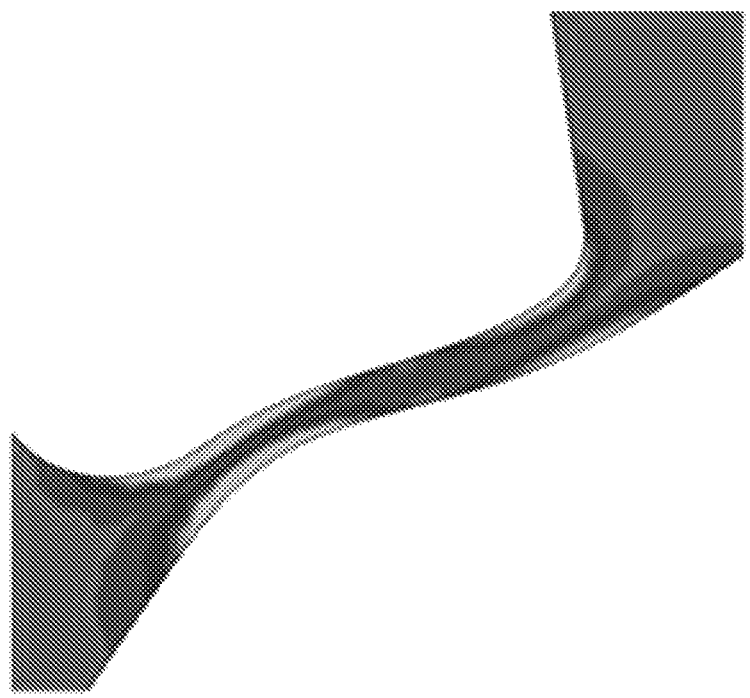
Figure 10G:
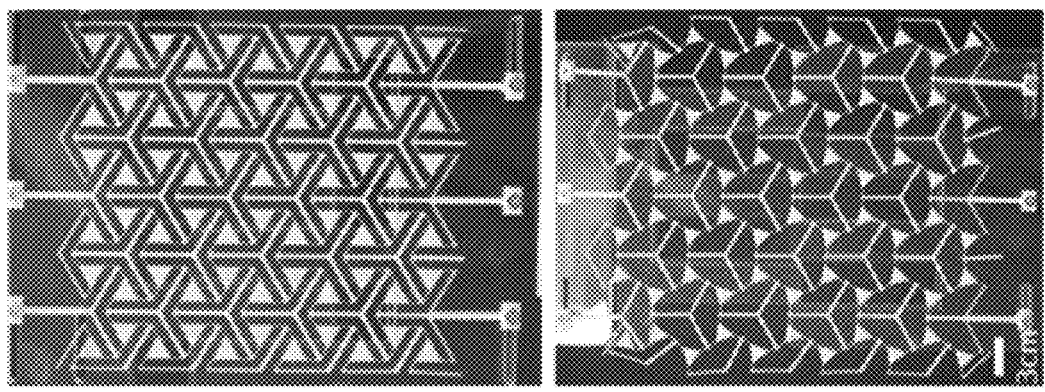

Referring now to FIGS. 9a-9f, two different BAM architectures are shown for comparison purposes. FIGS. 9a-9c depict a design of a bistable auxetic metamaterials that may be suitable for use with an elastomeric material, similar to those described above with reference to FIGS. 2a-2f, for example. FIGS. 9d-9f however show a design of a bistable auxetic metamaterial in accordance with an alternate embodiment which may be better suited for use with a more rigid material, such as elasto-plastic materials.

The depicted bistable auxetic metamaterials each include (a) building block sketch, (b) un-deformed and deformed unit cell and (c) un-deformed and deformed 6×6 sample of "soft" BAM, (d) building block sketch, (e) un-deformed and deformed unit cell and (f) un-deformed and deformed 6×6 sample of "rigid" BAM.

There is accordingly provided, in accordance with the alternate embodiments described herein and depicted in FIGS. 9d-9f and 10a-10g for example, a rigid planar monolithic BAM design is introduced by exploiting a thin ligament which triggers buckling during the switch of different stable states. FE simulations are used to investigate how bi-stability and failure are controlled by the geometric factors of the ligament. The durability of the rigid BAM is investigated in experimental studies. By carefully designing and optimizing the profile of the ligament corner, stress localization is smoothed, thus the durability of the rigid BAM is improved. A combination of FE simulations and experiments are used to further assess the performance of such an improvement. The contribution of this work lies in the expansion of the range of raw material selection for BAM, from elastomer to rigid elasto-plastic materials with the potential of further extending BAM to accommodate brittle materials like ceramic and glass.

In the design of BAM made of elastomers (FIGS. 9a-9c), three mutually intersecting cuts are comprised in one building block leaving a triangular rotating unit. By leaving finite-sized hinges with a thickness t, the BAM's unit cell deploys as the rotating units rotate with respect to the hinges (FIGS. 9(a) and 9(b)). If such BAM design were to be implemented on rigid materials, the hinges may undergo a large deformation beyond what they can withstand within their elastic region during rotation. The hinges may therefore quickly deform plastically and risk fracturing before the BAM fully deploys. The goal is therefore to provide a way for rigid materials to avoid the large deformation involved in such rotations. Inspired by a general design approach of tuning auxetic metallic metamaterials deforming plastically by inducing buckling behavior as described above, the inventors have accordingly devised a BAM design where thin ligaments are exploited in place of the previous hinges. See FIGS. 9d and 9e). The rigid BAM as shown in FIGS. 9d-9f therefore has ligaments that are parameterized by a length (l) and a thickness (t) that control the buckling behavior during the BAM deployment (FIG. 9(d)). Based on the fact that the rigid BAM design proposed here is size-independent, unit cells with different edge lengths (L) were manufactured for different parts of experiments considering the limitations in manufacturing, data recording and testing machine sizes. The rotating unit length (a), the ligament length (l) and the ligament thickness (t) were all normalized by L. For all samples in the simulations and experiments, the normalized rotating unit length (a/L) was fixed at a/L=0.4 while the normalized ligament length (l/L) and the normalized ligament thickness (t/L) were changed to study how the behaviors of the rigid BAM are controlled by these parameters.

The exemplary BAM sample shown in FIG. 9(f) was designed to have an edge length L=36 mm, l/L=0.14 and t/L=0.1125. All samples in the experiments were made of Delrin® Acetal Resin with a Young's modulus E=3.853 Gpa, a yield strength $\sigma_y$=41.175 Mpa and an ultimate strength $\sigma_{ult}$=80.160 Mpa. Such material was chosen because it captures the characteristics of the rigid elasto-plastic materials and it can be easily manufactured using a laser cutter.

In FIGS. 10a-10g, rigid BAM corner profiles and designs are depicted, and include (a) $G^0$ corner profile design sketch, (b) (c) comparison of the Von Mises stress distribution between FE analysis and experiment on ligament with $G^0$ corner profile, (d) $G^2$ corner profile design sketch, (e) (f) comparison of the Von Mises stress distribution between FE analysis and experiment on ligament with $G^2$ corner profile, (g) un-deformed and deformed 6×6 sample of the rigid BAM with $G^2$ corner profile.

Figure 11A:
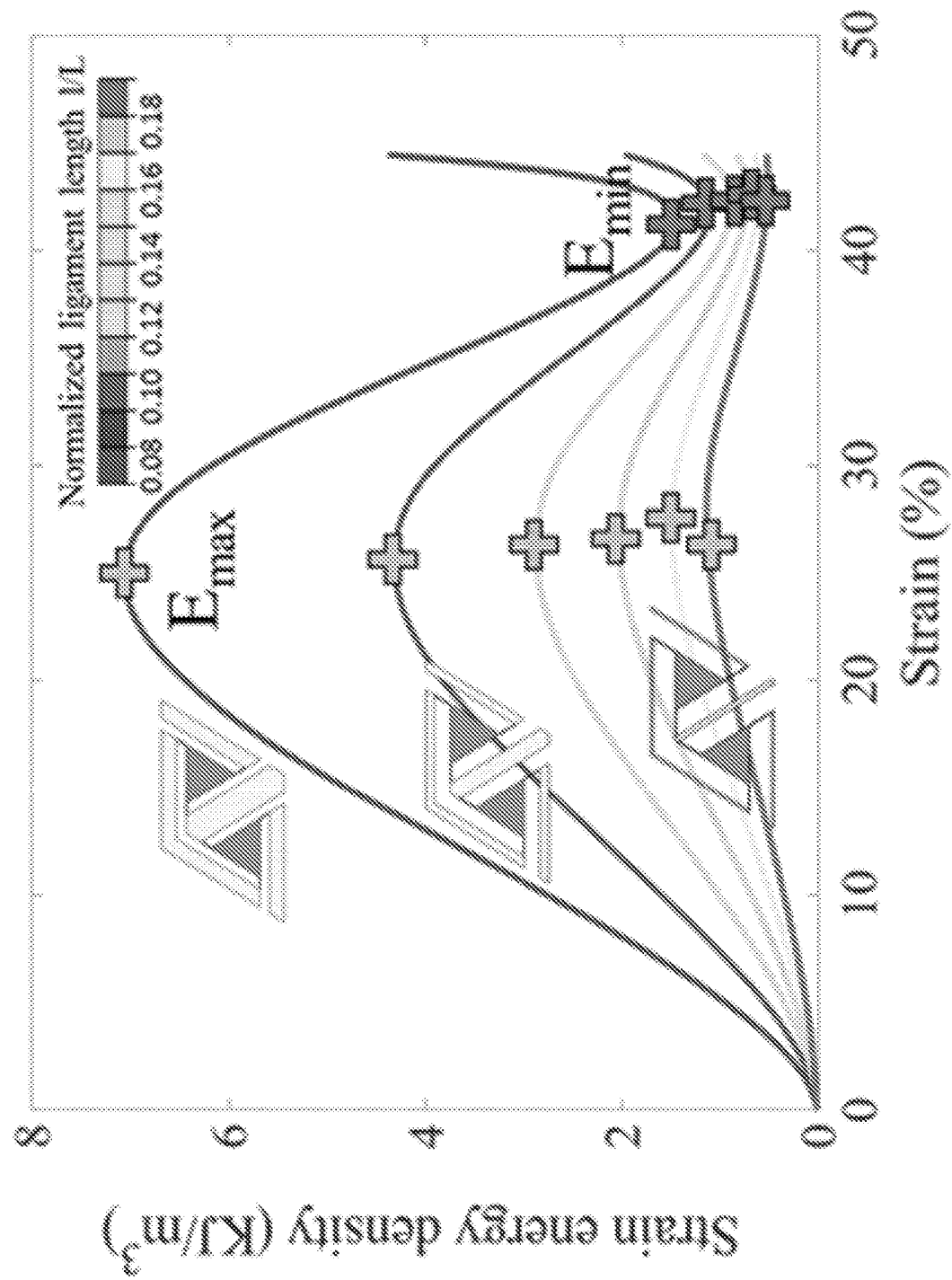
FIGS. 11a-11d are graphs depicting the results of evaluation of the change of bistability and failure behavior of varying ligament lengths of the rigid BAM as shown in FIGS. 9c-10g.
Figure 11B:
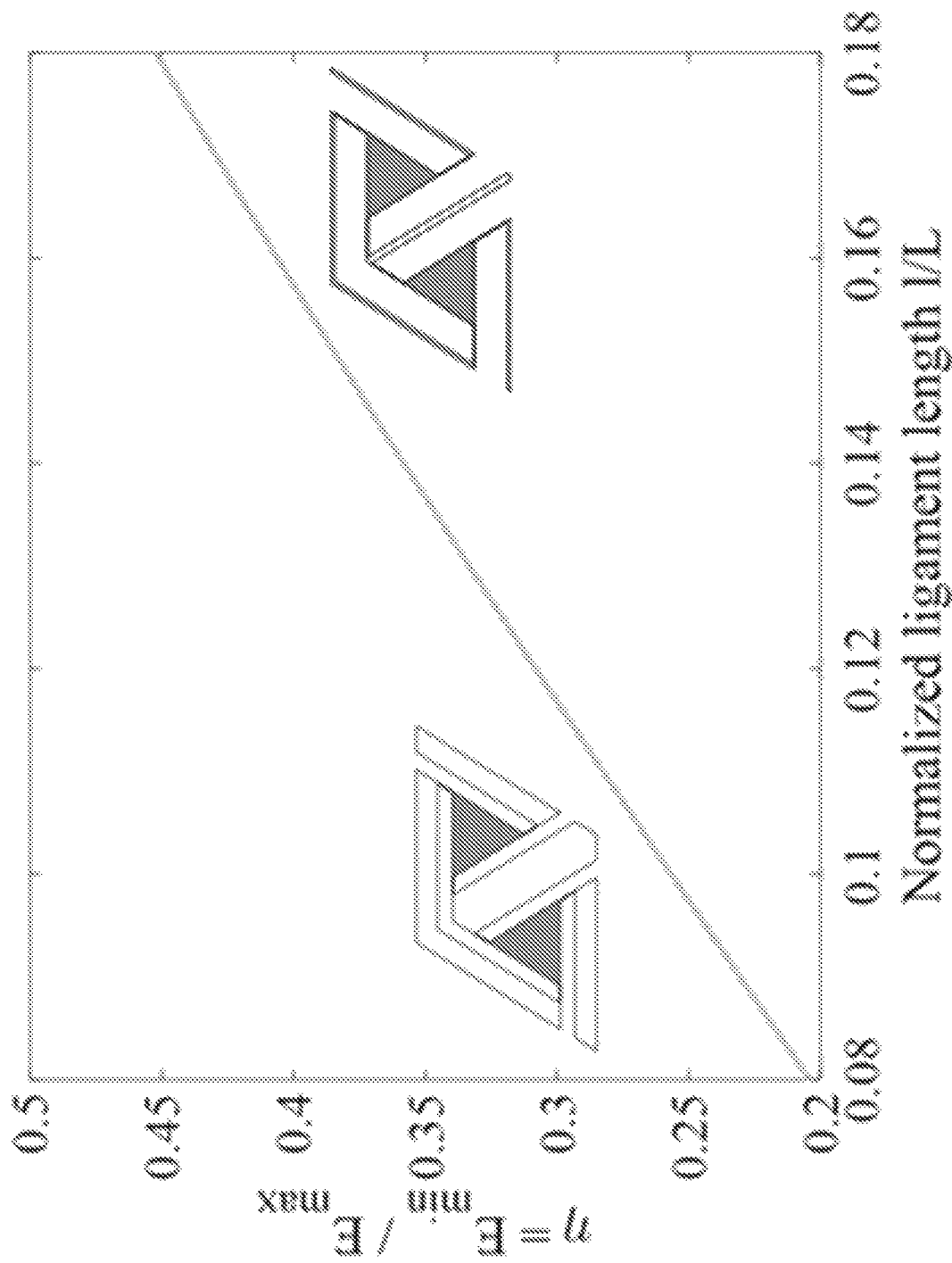
Figure 11C:
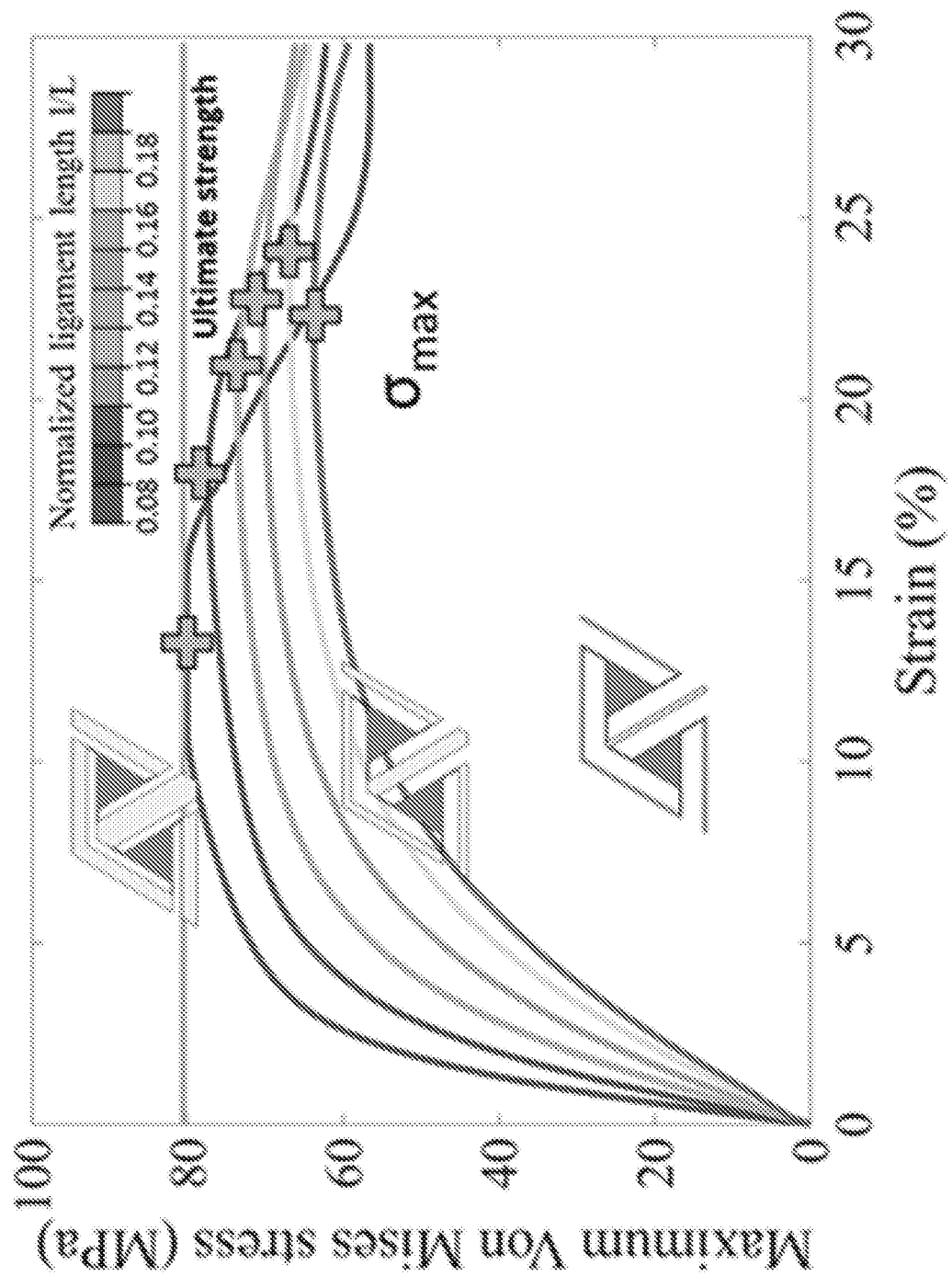
Figure 11D:
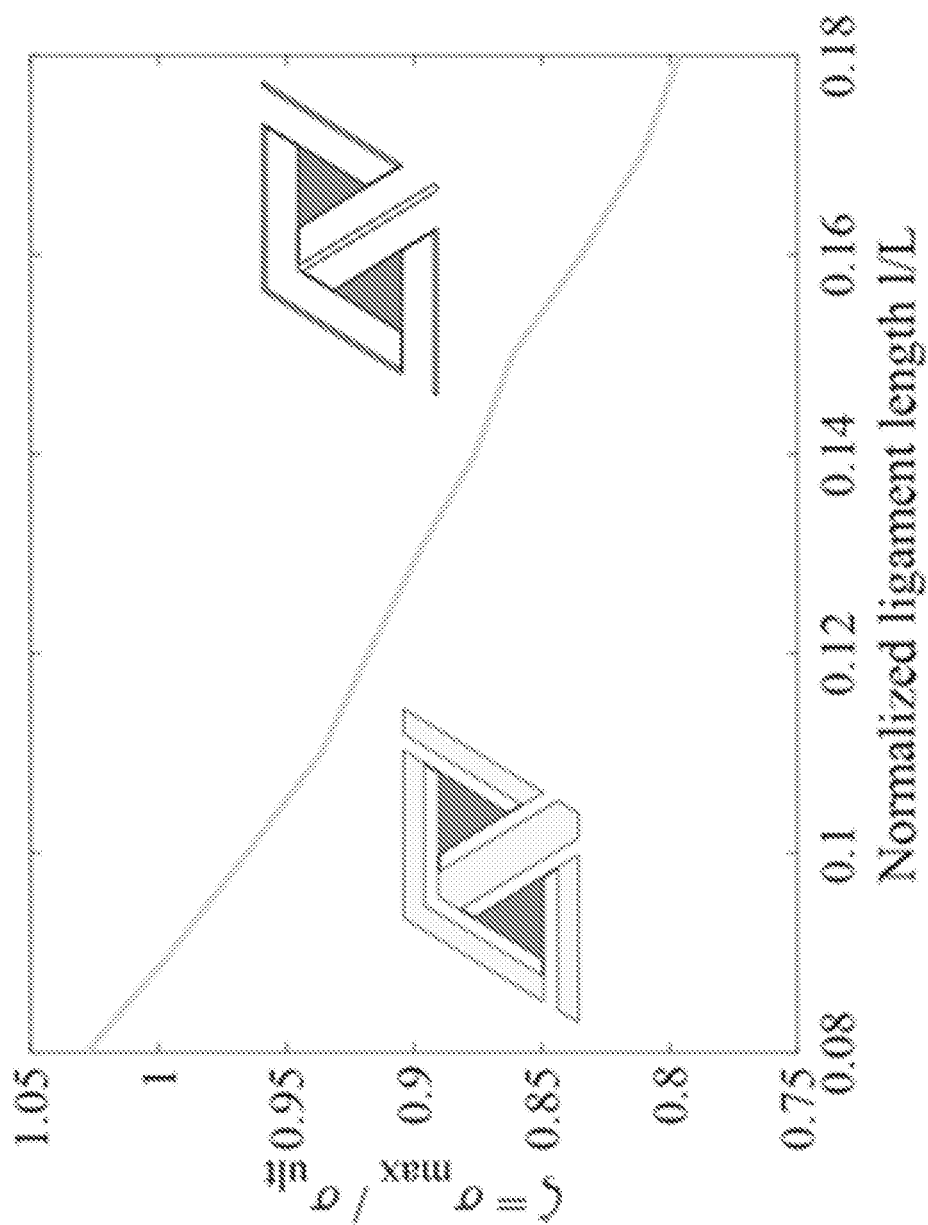

In FIGS. 11a-11d, the change of bistability and failure behavior with ligament length obtained by FE analysis are depicted. In FIG. 11(a) strain energy density versus strain for unit cells with different l/L under periodic boundary conditions are shown. In FIG. 11(b), η versus l/L showing the change in bistability is graphically depicted. In FIG. 11(c), maximum Von Mises stress throughout the ligament versus strain for unit cells with different l/L under periodic boundary conditions are shown. In FIG. 11(d), the ζ versus l/L showing the change in failure behavior is graphically depicted.

Figures 12A, 12B:
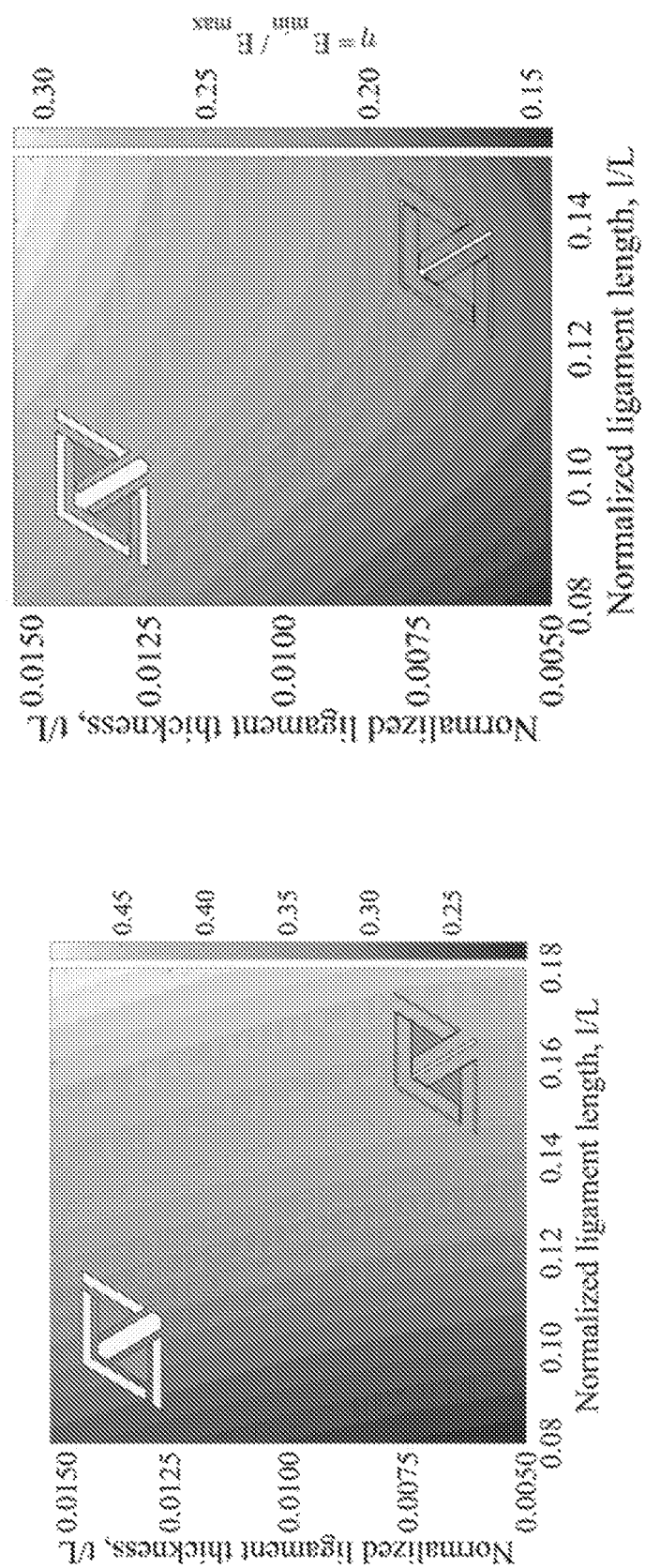
FIGS. 12a-12b and 13a-13b depict contour plots of the rigid BAM architecture of FIGS. 9c-10g, obtained by finite element analysis.
Figure 13B:
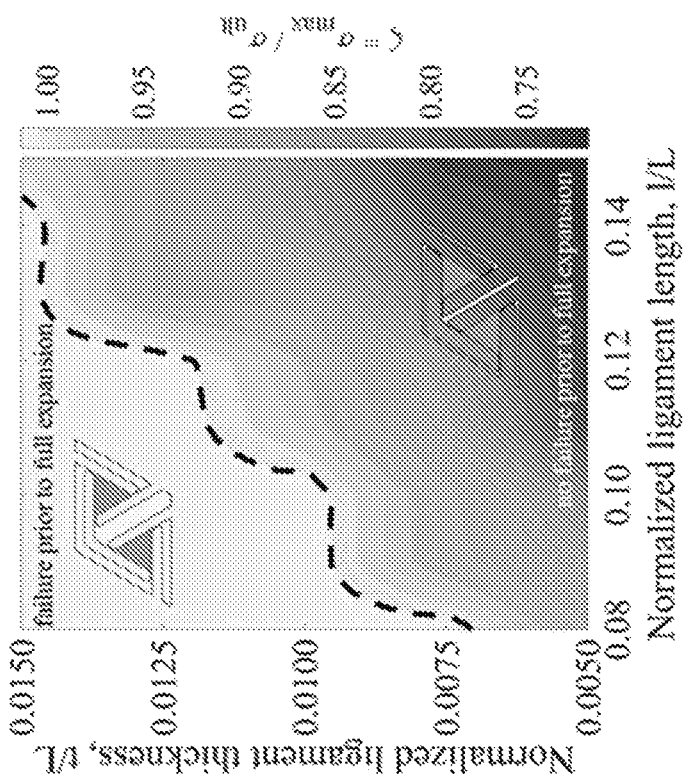
Figure 13A:
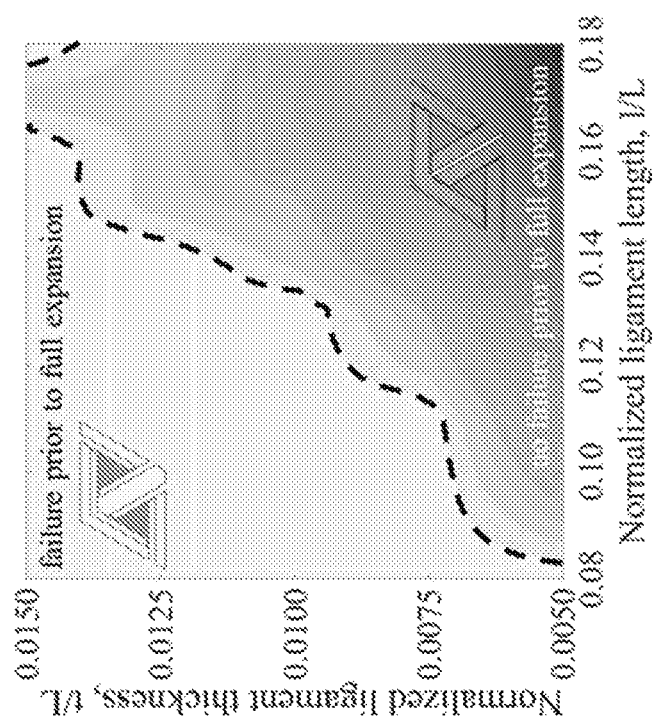

In FIGS. 12a-12b, contour plots are depicted which were obtained by FE analysis, showing how bi-stability is controlled by l/L and t/L for designs with (a) $G^0$ corner profile and (b) $G^2$ corner profile. In FIGS. 13a-13a, contour plots are depicted which were obtained by FE analysis, showing how failure behavior is controlled by l/L and t/L for designs with (a) $G^0$ corner profile and (b) $G^2$ corner profile.

Figure 14A:
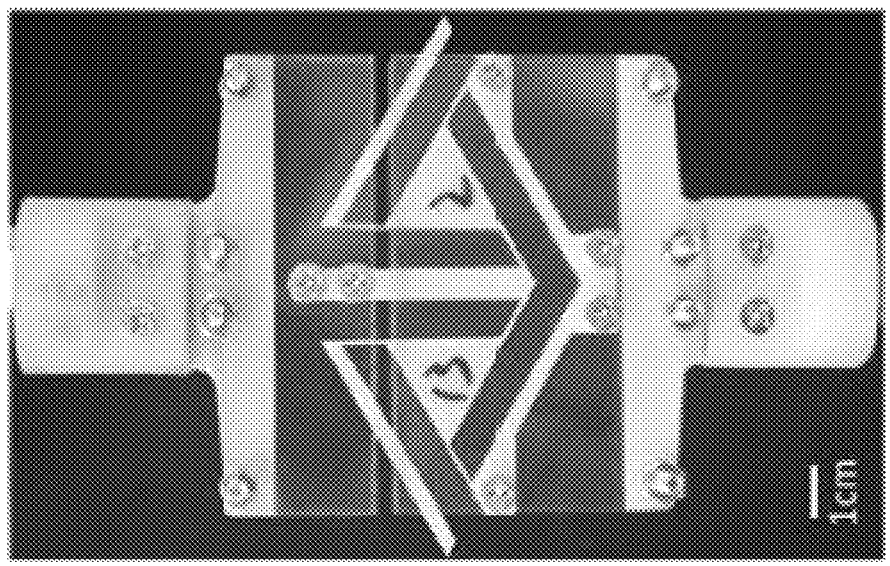
FIGS. 14a-14c depict testing equipment and results obtained from durability tests conducted to evaluate the rigid BAM architecture of FIGS. 9c-10g.
Figure 14B:
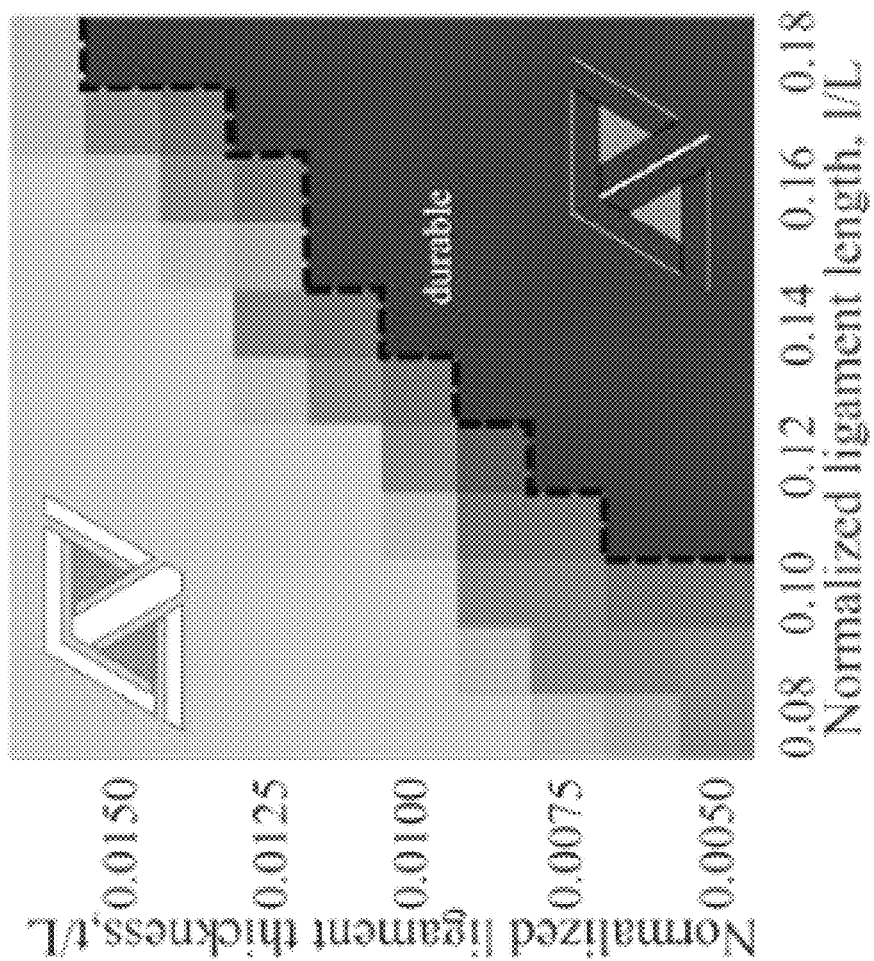
Figure 14C:
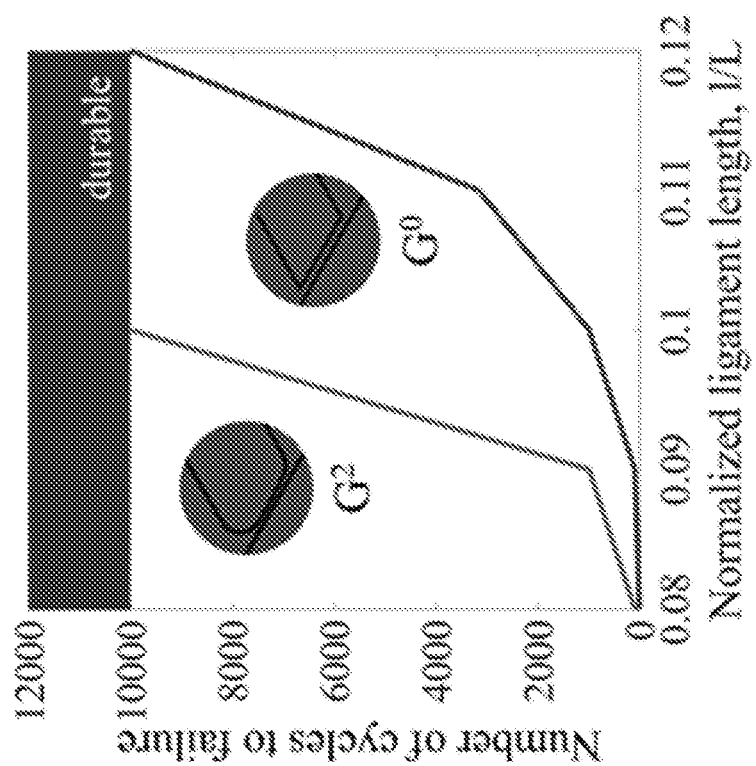

FIGS. 14a-14c depict the equipment used and results obtained from durability tests conducted to evaluate the rigid BAM as described herein. FIG. 14(a) shows a test fixture designed for durability tests, providing periodic boundary conditions for unit cell testing samples. FIG. 14(b) depicts a contour plot obtained by durability tests, showing how durability is controlled by l/L and t/L for designs with $G^0$ corner profile. In the graph of FIG. 14(c), the number of cycles to failure versus l/L obtained by durability tests compares the durability performance between samples with $G^0$ and $G^2$ corner profiles with a fixed t/L=0.0075.

Figure 15A:
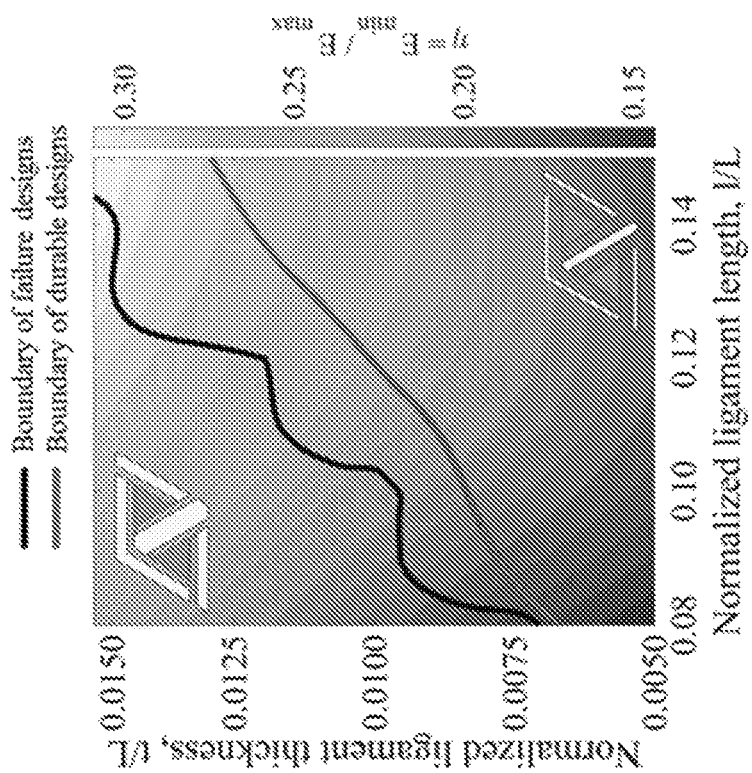
FIGS. 15a-15b graphically depict contour plots showing how bistability, failure and durability of the rigid BAM architecture are controlled by the normalized ligament thickness and normalized ligament length for two different rigid BAM corner profiles.
Figure 15B:
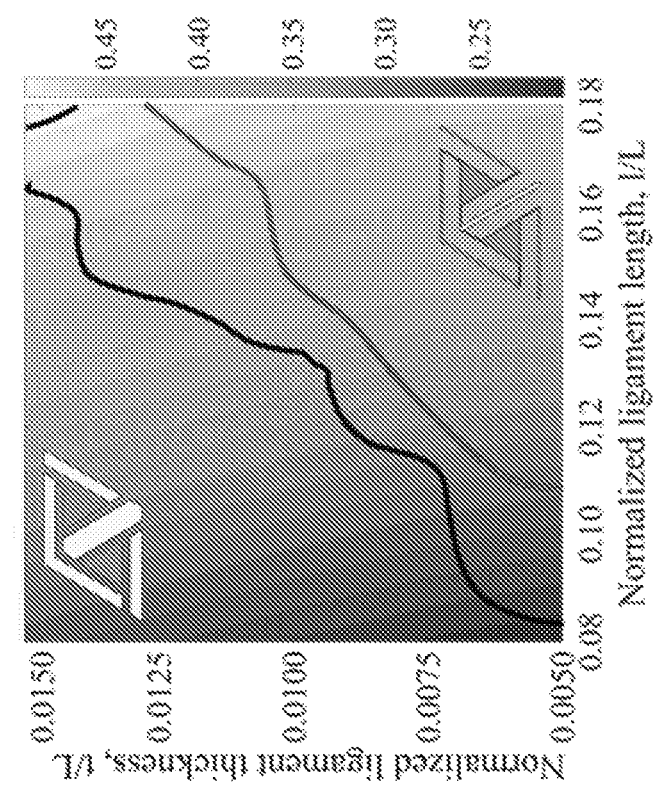

FIGS. 15a-15b depict graphs showing how bi-stability, failure and durability are controlled by t/L and l/L for designs with (a) $G^0$ and (b) $G^2$ corner profiles.

BAM Forming 3D Geometries

Referring now to FIGS. 16a-18c, a number of exemplary embodiments of the application of BAM to form three-dimensional (3D) geometries are provided.

Upon rational tuning of the unit cell geometry, BAM can be used to form 3D surfaces, such as a cylinder, a cone or a sphere, for example.

Figure 16B:
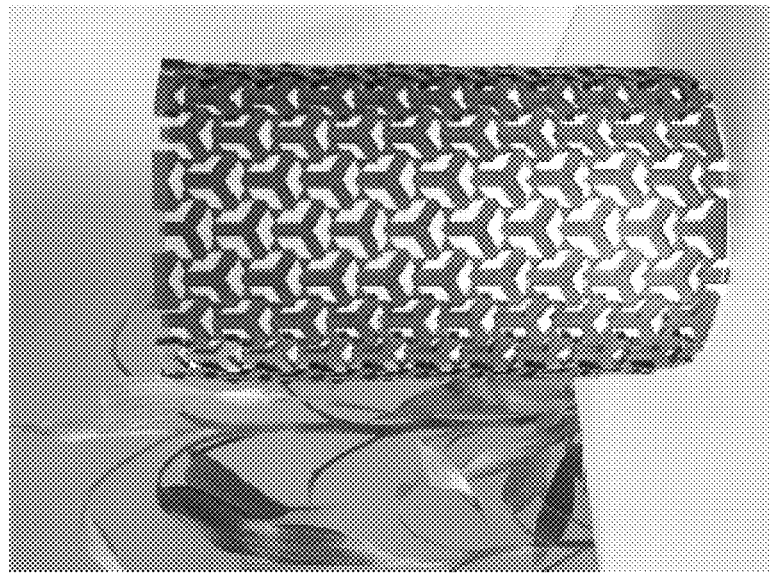
Figure 16A:
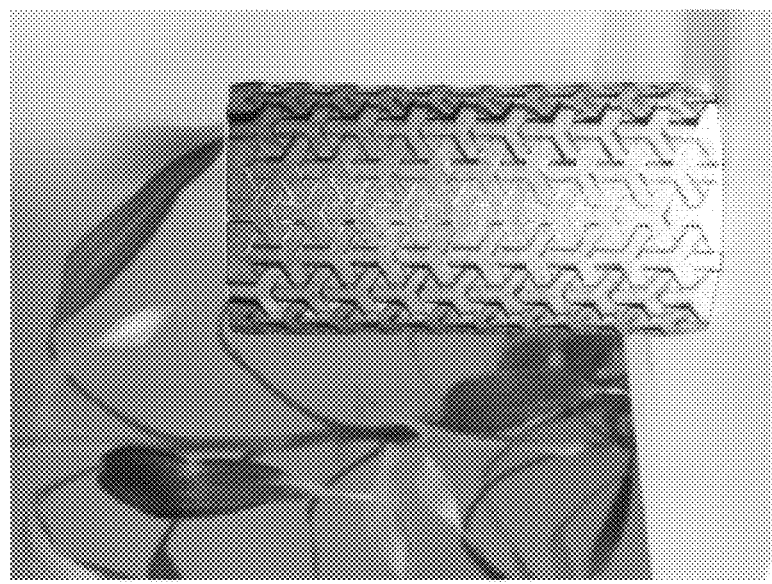
Figure 17B:
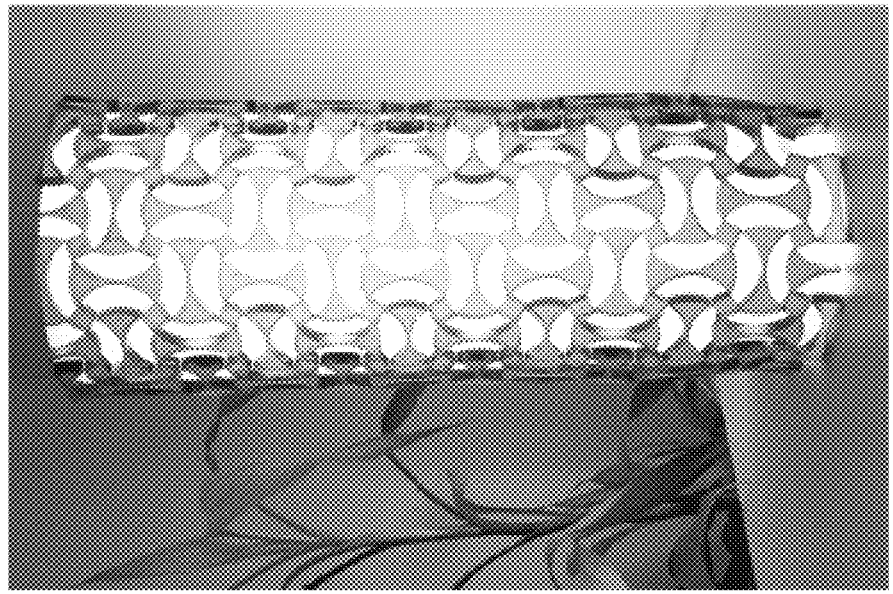
Figure 17A:
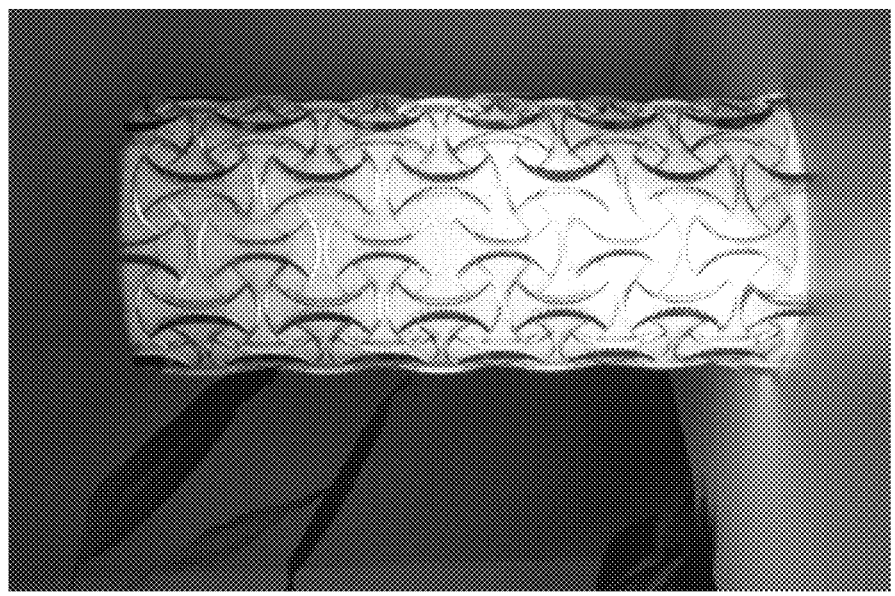

FIGS. 16a-16b respectively show a closed and an expanded position of a BAM 3D geometry, in this case forming a tubular lamp shade. FIGS. 17A and 17B similarly show a tubular lamp shade in both a closed and an open or expanded position, also formed of a 3D BAM but having a different BAM configuration/design than that of the lamp shade of FIGS. 16A-16B.

Figure 18C:
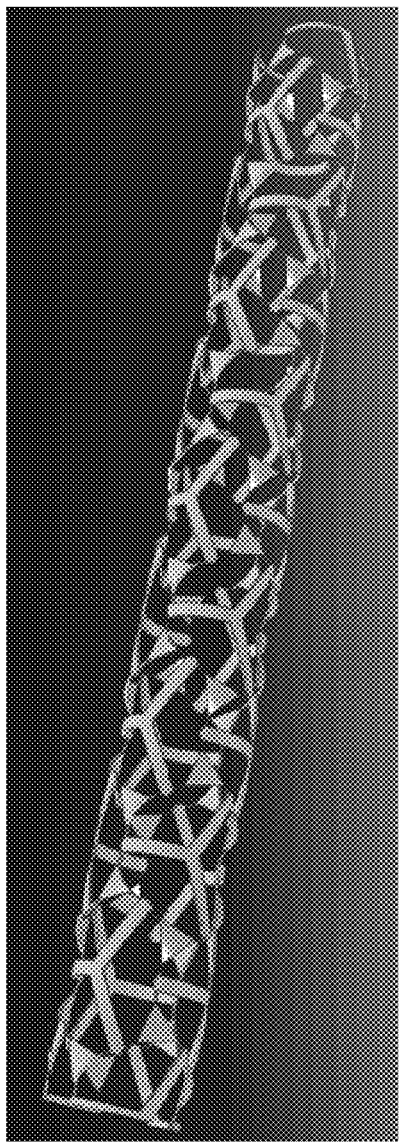

FIGS. 18a-18c depict a stent which is formed by 3D BAM as described herein. FIG. 18a shows the stent in a closed (un-deformed) configuration, wherein the gaps of the BAM are substantially closed. In FIG. 18b, the stent is shown in a partially expanded position, whereby the gaps of the BAM are only partially (semi) closed. FIG. 18c depicts the same expandable stent, but in a fully open position, whereby the stent has increased in diameter relative to the initial, fully closed position of FIG. 18a. Thus, the stent can be expanded to any one of a number of selected positions or sizes, as may be required, simply by applying a tensile load on one or both of the ends of the stent and thus causing the diameter thereof to expand as required. The advantage of this stent design is that the opening does not require any balloon, and the stent can be deployed and closed without undergoing plasticity. This is typically not possible using traditional balloon-expandable stents.

Smart BAM

The inventors have also developed further alternate embodiments and uses of the BAM as described above. In these embodiments, "smart" BAM are provided. Such smart BAM may for example be operable to respond to an external stimulus such as light and/or sound, rather than directly applied physical force.

Figure 19B:
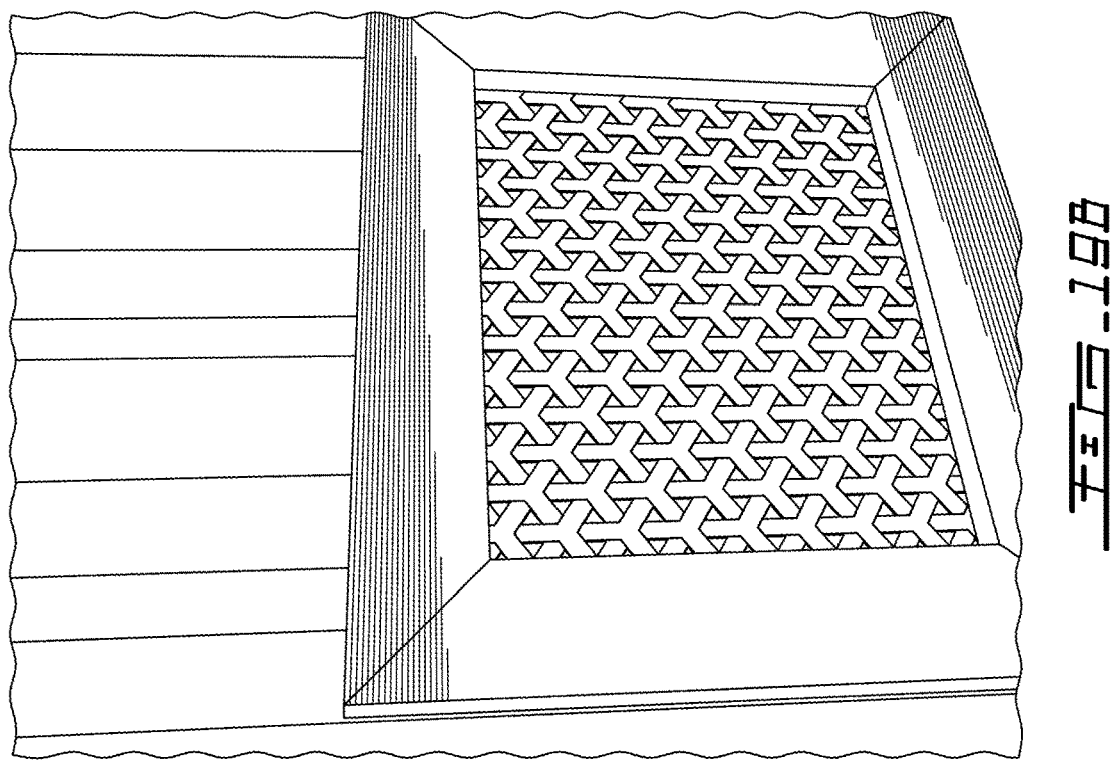
FIGS. 19a-19b depict an alternate "smart" BAM that is operable to expand and contract in response to incident light intensity.
Figure 19A:
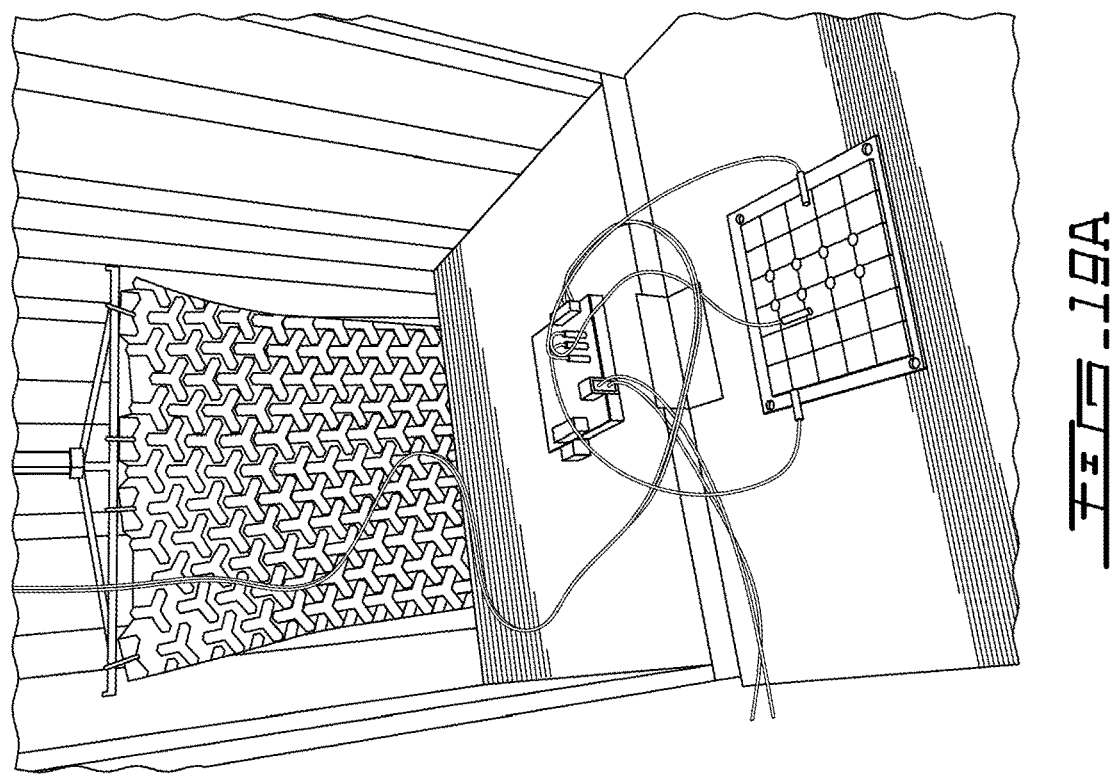

In the embodiment of FIGS. 19a-19b, a BAM is provided which is used for light sensing and/or shading. More particularly, a BAM is integrated with a closed-loop, electro-mechanical control system, that enables it to expand and contract upon variations in incident light intensity. Possible applications of light-excited BAM include expandable solar panels and "smart" window drapes, which are operable to open and close independently, depending on the sensed intensity of incident light.

Figure 20C:
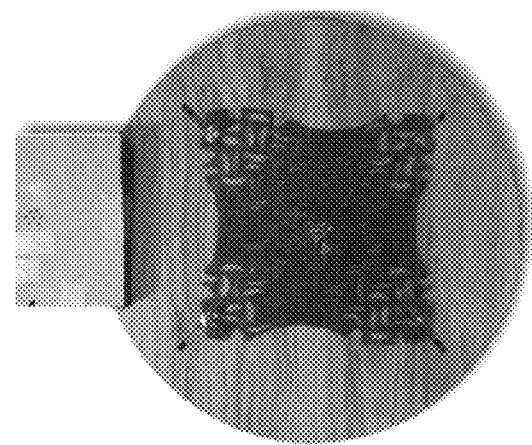
FIGS. 20a-20c depict a testing set-up for an alternate smart BAM that is operable to deform, by expanding and/or contracting, in response to acoustic signals.
Figure 20B:
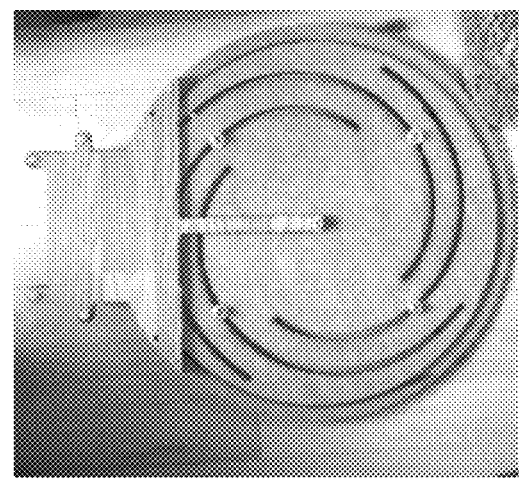
Figure 20A:
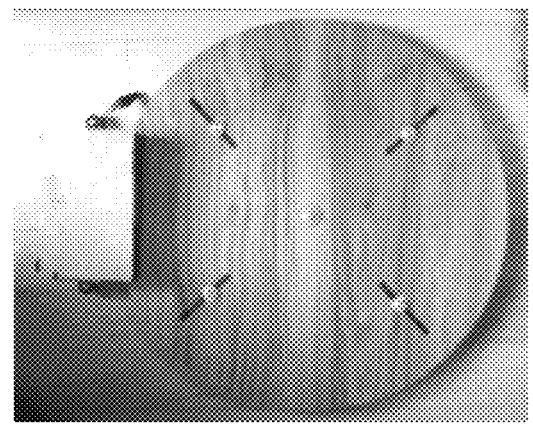

In the embodiment of FIGS. 20a-20c, a prototype used to test a smart BAM that is operable to respond to acoustic signals. In this embodiment, a closed-loop, electromechanical control system was developed to enable the designed BAM to expand and contract in response to one or more sensed sounds (e.g. specific words, notes, frequencies or ranges of frequencies, etc.).

BAM Having Integrated Smart Materials

In a final exemplary embodiment, a BAM is provided which includes one or more "smart" materials therein. For example, a BAM having Nitinol integrated directly into the solid shape of the BAM configuration. Nitinol is a shape memory and super-elastic alloy which can reversely undergo deformation upon a temperature change above its given "transformational temperature". Thus, a BAM that includes Nitinol wires directly incorporated into the body of the BAM structure makes possible a BAM that is operable to open and close in response, for example, to the ambient temperature. This enables a number of possible applications, wherein it may be desirable to keep a region or opening closed (i.e. blocked) below a predetermined threshold temperature and open above this threshold temperature, and vice versa.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An auxetic metamaterial comprising an assembly of a plurality of interconnected building blocks displaceable relative to each other, the building blocks including rotating elements defining sides interconnected to each other at vertex points and translating elements pivotally connected to the rotating elements at the vertex points, the vertex points defining hinges between the rotating elements and the translating elements, a shape of the rotating elements different than that of the translating elements, the assembly being non-plastically and reversibly deformable from a collapsed position to an expanded position upon application of a first load, and the assembly being non-plastically and reversibly deformable from the expanded position to the collapsed position upon application of a second load, the assembly being bistable and thereby defining a first stable state in the collapsed position and a second stable state in the expanded position, wherein in the first stable state the assembly maintains the collapsed position after removal of the second load applied thereon and, in the second stable state, the assembly maintains the expanded position after removal of the first load applied thereon, and wherein, between the expanded position and the collapsed position, the translating elements being substantially non-rotatable from the first stable state to the second stable state, the building blocks move relative to each other such that the assembly deforms toward a closest one of the expanded position and the collapsed position after removal of either of the first load and the second load applied on the assembly, a dimension of the assembly of the plurality of interconnected building blocks taken in a direction normal to a direction of application of the first load being greater in the expanded position than that in the collapsed position.

2. The auxetic metamaterial as defined in claim 1, wherein a ratio of a local minimum strain energy of the building blocks in the expanded position, to a local maximum strain energy of the building block, is less than one.

3. The auxetic metamaterial as defined in claim 1, wherein each of the rotating elements includes three or more of the vertex points, the rotating elements being rotatable between a first fixed orientation and a second fixed orientation, the first fixed orientation corresponding to the collapsed position of the assembly and the second fixed orientation corresponding to the expanded position of the assembly; and wherein each of the building blocks includes three or more of the translating elements pivotally connected to the rotating element by corresponding hinges defined at the three or more of the vertex points permitting relative rotation between the translating elements and the rotating element, and wherein translation of the translating elements away from the rotating element causes rotation of the rotating element from the first fixed orientation to the second fixed orientation, and translation of the translating elements toward the rotating element causes rotation of the rotating element from the second fixed orientation to the first fixed orientation.

4. The auxetic metamaterial as defined in claim 3, wherein the rotating element of the building block has a normalized length (a/l) defined as a ratio of a length (a) of a side of the rotating element over a length (l) of a side of the building block, the normalized length (a/l) being between 0.2 and 0.8.

5. The auxetic metamaterial as defined in claim 3, wherein the hinges of the building block pivotally connecting the rotating element and the translating elements having a normalized hinge thickness (t/l) defined as a ratio of a thickness (t) of the hinges between the vertex points and the translating elements over the length (l) of a side of the building block.

6. The auxetic metamaterial as defined in claim 5, wherein the hinges have a predetermined thickness that is selected to achieve bistability before the material, from which the building block is made, yields by deforming plastically with irreversible deformation.

7. The auxetic metamaterial as defined in claim 5, wherein the normalized hinge thickness i between 0.01 and 0.09.

8. The auxetic metamaterial as defined in claim 3, wherein the rotating element of the building block is defined by a plurality of cuts through a thickness of the building block, each cut extending between two adjacent vertex points of the rotating element.

9. The auxetic metamaterial as defined in claim 3, wherein each translating element has a side adjacent to a respective side of the rotating element and the building block has a tilted motif defined by the side of the translating element extending between a respective one of the vertex points and a respective corner of the building block, the side of the translating element being angled by an angle ($\theta$) relative to a respective side of the building block.

10. The auxetic metamaterial as defined in claim 9, wherein the rotating element has four sides extending between four vertex points and the angle ($\theta$) ranges between more than 0 and $\pi/4$.

11. The auxetic metamaterial as defined in claim 9, wherein the rotating element has three sides extending between three vertex points and the angle ($\theta$) ranges between more than 0 and $\pi/6$.

12. The auxetic metamaterial as defined in claim 3, wherein the rotating element has three or more arcuate sides defined between the three or more vertex points and the building block has a circular motif defined by a normalized radius (R/l), the normalized radius is a ratio of a radius (R) defined by a straight line extending from a corner of the building block to a corresponding opposite arcuate side of the rotating element over the length (l) of a side of the building block.

13. The auxetic metamaterial as defined in claim 12, wherein the rotating element has four sides extending between four vertex points and the normalized radius (R/l) ranges between $1/\sqrt{2}$ and 1.

14. The auxetic metamaterial as defined in claim 12, wherein the rotating element has three sides extending between three vertex points and the normalized radius (R/l) ranges between $\sqrt{8}/8$ and $\sqrt{8}/2$.

15. The auxetic metamaterial as defined in claim 3, wherein each translating element of the building block has a corresponding side parallel to a respective side of the building block and the building block has a parallel motif defined by a width parameter (w/l), the width parameter is a ratio of a width (w) between the corresponding side of the translating element and the respective side of the building block over the length (l) of the respective side of the building block.

16. The auxetic metamaterial as defined in claim 15, wherein the rotating element has four sides extending between four vertex points and the width parameter (w/l) ranges between more than 0 and 1/2.

17. The auxetic metamaterial as defined in claim 16, wherein the rotating element has three sides extending between three vertex points and the width parameter (w/l) ranges between more than 0 and $\sqrt{8}/6$.

18. The auxetic metamaterial as defined in claim 3, wherein the translating elements are non-rotating elements.

19. The auxetic metarnaterial as defined in claim 3, wherein at least one translating element of the three or more of translating elements of a first building block is connected to a corresponding translating element of a second building block.

20. A building block of an auxetic metamaterial, the building block comprising:
a rotating element centrally disposed within the building block and having three or more vertex points, the rotating element being rotatable about a center of rotation;
three or more translating elements disposed around the rotating element, having a shape different than that of the rotating element, and pivotally connected thereto by hinges, each one of the translating elements being pivotally connected to a respective one of the vertex points of the rotating element by a corresponding hinge to permit relative rotation between the translating elements and the rotating element, the three or more translating elements being non-plastically and reversibly displaceable relative to the rotating element from a collapsed position of the building block to an expanded position of the building block upon application of a first load and non-plastically and reversibly deformable from the expanded position to the collapsed position upon application of a second load, the three or more translating elements being substantially non-rotatable from the collapsed position to the expanded position; and
wherein the building block is in a first stable state in the collapsed position and in a second stable state in the expanded position, wherein the rotating element maintains a first fixed orientation relative to the three or more translating elements in the first stable state and maintains a second fixed orientation relative to the three or more translating elements in the second stable state such that, in the first stable state, the building block maintains the collapsed position after removal of the second load applied thereon and, in the second stable state, the building block maintains the expanded position after removal of the first load applied thereon, wherein, between the expanded position and the collapsed position, the building block moves toward a closest one of the expanded position and the collapsed position after removal of either of the first load and the second load applied on the building block, wherein translation of the translating elements in respective opposed directions away from the center of rotation of the rotating element causes rotation of the rotating element such that the building block deforms from the first stable state to the second stable state, and translation of the translating elements in respective opposed directions toward the center of rotation of the rotating element causes rotation of the rotating element such that the building block deforms from the second stable state to the first stable state.

21. A unit cell of an auxetic meta material, the unit cell comprising:
a plurality of building blocks, each building block comprising:
a rotating element centrally disposed within the building block and having three or more vertex points, the rotating element being rotatable about a center of rotation;
three or more of translating elements disposed around the rotating element, having a shape different than that of the rotating element, and pivotally connected thereto by hinges, each one of the translating elements being pivotally connected to one of the vertex points of the rotating element by a corresponding hinge to permit relative rotation between the translating elements and the rotating element, the three or more translating elements being non-plastically and reversibly displaceable relative to the rotating element from a collapsed position of the building block to an expanded position of the building block upon application of a first load and non-plastically and reversibly deformable from the expanded position to the collapsed position upon application of a second load, the three or more translating elements being substantially non-rotatable from the collapsed position to the expanded position; and
wherein the building block is in a first stable state in the collapsed position and in a second stable state in the expanded position, wherein the rotating element maintains a first fixed orientation relative to the three or more translating elements in the first stable state and maintains a second fixed orientation relative to the three or more translating elements in the second stable state such that, in the first stable state, the building block maintains the collapsed position after removal of the second load applied thereon and, in the second stable state, the building block maintains the expanded position after removal of the first load applied thereon, wherein, between the expanded position and the collapsed position, the building block moves toward a closest one of the expanded position and the collapsed position after removal of either of the first load and the second load applied on the building block, wherein translation of the translating elements in respective opposed directions away from the center of rotation of the rotating element causes rotation of the rotating element such that the building block deforms from the first stable state to the second stable state, and translation of the translating elements in respective opposed directions toward the center of rotation of the rotating element causes rotation of the rotating element such that the building block deforms from the second stable state to the first stable state;
wherein two adjacent building blocks are at least connected to each other by connecting a first translating element of a first building block to a second translating element of a second building block.

* * * * *